(12) United States Patent
Said et al.

(10) Patent No.: US 10,349,085 B2
(45) Date of Patent: Jul. 9, 2019

(54) EFFICIENT PARAMETER STORAGE FOR COMPACT MULTI-PASS TRANSFORMS

(71) Applicant: QUALCOMM Incorporated, San Diego, CA (US)

(72) Inventors: Amir Said, San Diego, CA (US); Xin Zhao, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 178 days.

(21) Appl. No.: 15/432,643

(22) Filed: Feb. 14, 2017

(65) Prior Publication Data

US 2017/0238014 A1    Aug. 17, 2017

Related U.S. Application Data

(60) Provisional application No. 62/295,448, filed on Feb. 15, 2016, provisional application No. 62/295,456, filed on Feb. 15, 2016.

(51) Int. Cl.

| | |
|---|---|
| *H04N 19/42* | (2014.01) |
| *H04N 19/44* | (2014.01) |
| *H04N 19/50* | (2014.01) |
| *H04N 19/60* | (2014.01) |
| *H04N 19/61* | (2014.01) |
| *H04N 19/70* | (2014.01) |

(Continued)

(52) U.S. Cl.
CPC ........... *H04N 19/61* (2014.11); *H04N 19/124* (2014.11); *H04N 19/159* (2014.11); *H04N 19/176* (2014.11); *H04N 19/439* (2014.11); *H04N 19/44* (2014.11); *H04N 19/50* (2014.11); *H04N 19/60* (2014.11); *H04N 19/70* (2014.11); *G06T 2207/20048* (2013.01)

(58) Field of Classification Search
CPC .... H04N 19/61; H04N 19/124; H04N 19/159; H04N 19/176; H04N 19/439; H04N 19/44; H04N 19/50; H04N 19/60; H04N 19/70
USPC ..................................................... 375/240.12
See application file for complete search history.

(56) References Cited

U.S. PATENT DOCUMENTS 7,502,743 B2    3/2009  Thumpudi et al.
8,321,207 B2   11/2012  Edler et al.
(Continued)

FOREIGN PATENT DOCUMENTS

CN            102811111 A        12/2012

OTHER PUBLICATIONS

Chen H., et al., "New Transforms Tightly Bounded by DCT and KLT," IEEE Signal Processing Letters, vol. 19, No. 6, Jun. 1, 2012, pp. 344-347.

(Continued)

*Primary Examiner* — Marnie A Matt
(74) *Attorney, Agent, or Firm* — Shumaker & Sieffert, P.A.

(57) ABSTRACT

A device determines a Compact Multi-Pass Transform (CMPT) from a plurality of CMPTs. Additionally, the device decompresses CMPT parameters for the CMPT. In instances where the device decodes video data, the device applies the CMPT to a coefficient block to reconstruct a residual block and decodes, based on a predictive block and the residual block, a current block of a picture of the video data. In instances where the device encodes video data, the device applies the CMPT to a residual block to construct a coefficient block and generates for output information indicating coefficient values for the coefficient block.

26 Claims, 11 Drawing Sheets

(51) Int. Cl.
H04N 19/124 (2014.01)
H04N 19/159 (2014.01)
H04N 19/176 (2014.01)

(56) References Cited

U.S. PATENT DOCUMENTS

| | | |
|---|---|---|
| 9,271,221 B2 | 2/2016 | Tong et al. |
| 2006/0010188 A1 | 1/2006 | Solomon et al. |
| 2012/0008675 A1 | 1/2012 | Karczewicz et al. |
| 2013/0114669 A1 | 5/2013 | Karczewicz et al. |
| 2017/0238013 A1 | 8/2017 | Said et al. |
| 2017/0238019 A1 | 8/2017 | Said et al. |

OTHER PUBLICATIONS

Cintra R.J., et al., "Energy-Efficient 8-Point DCT Approximations: Theory and Hardware Architectures," Circuits, Systems and Signal Processing, vol. 35, No. 11, Dec. 30, 2015, pp. 4009-4029.
International Search Report and Written Opinion of International Application No. PCT/US2017/017944, dated Apr. 12, 2017, 16 pp.
Mandyam G., et al., "Lossless Image Compression Using the Discrete Cosine Transform," Journal of Visual Communication and Image Representation, vol. 8, No. 1, Mar. 1, 1997, retrieved on Mar. 6, 1995, pp. 21-26.
Parfieniuk M., "Using the CS Decomposition to Compute the 8-Point DCT," IEEE International Symposium on Circuits and Systems (ISCAS), May 1, 2015, pp. 2836-2839.
Zhu S., at al., "In Search of "Better-than-DCT" Unitary Transforms for Encoding of Residual Signals," IEEE Signal Processing Letters, vol. 17, No. 11, Nov. 1, 2010, pp. 961-964.
ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
ITU-T Rec. H.261 (Dec. 1990), "Line Transmission on Non-Telephone Signals, Video Codec for Audiovisual Services AT p×64 kbit/s", Dec. 1990, 32 pp.
ITU-T H.263, Series H: Audiovisual and Multimedia Systems, Infrastructure of audiovisual services—Coding of moving video, Video Coding for low bit rate communication, Jan. 2005, 226 pp.
ITU-T Rec. H.262 (Jul. 1995), "Transmission on Non-Telephone Signals, Information Technology—Generic Coding of Moving Pictures and Associated Audio Information: Video", Jul. 1995, 211 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
Sullivan G., Overview of the High Efficiency Video Coding (HEVC) Standard, IEEE Transactions on Circuits and Systems for Video Technology, vol. 22, No. 12, pp. 1649-1668, Dec. 2012.
Ye Y., Improved H.264 Intra Coding Based on Bi-Directional Intra Prediction, Directional Transform, and Adaptive Coefficient Scanning, in Proc. IEEE Int. Conf. Image Process., San Diego, CA, Oct. 2008, pp. 2116-2119.
Wien M., "High Efficiency Video Coding", Coding Tools and Specification, Springer-Verlag, Berlin, 2015, 30 pp.

Said A., "Highly Efficient Non-Separable Transforms for Next Generation Video Coding", 2016 Picture Coding Symposium (PCS): Nuremberg, Germany, Dec. 4-7, 2016; IEEE, pp. 1-5.
Zhao X., EE1: Improvements on non-separable secondary transform, Joint Video Exploration Team (JVET) of ITU-T SG16 WP3 and ISO/IEC JTC1/SC29/WG11 4th Meeting: Chengdu, CN, JVET-D0120, Oct. 15-21 2016, 5 pp.
Britanak V., et al., "Discrete Cosine and Sine Transforms", General Properties, Fast Algorithms and Integer Approximations, Academic Press, Apr. 2007, pp. 16-38.
Zhao X., et al., "TU-level non-separable secondary transform", Joint Video Exploration Team (JVET) of ITU-T SG16 WP3 and ISO/IEC JTC1/SC29/WG11 2nd Meeting: San Diego, USA, Feb. 20-26, 2016, JVET-B0059, 5 pp.
Zhao X., et al., "EE2.7: TU-level non-separable secondary transform", Joint Video Exploration Team (JVET) of ITU-T SG16 WP3 and ISO/IEC JTC1/SC29/WG11 3rd Meeting: Geneva, CH, May 26-Jun. 1, 2016, JVET-00053_v3, 10 pp.
Takamura S., et al., "On Intra Coding Using Mode Dependent 2D-KLT", in Proc 30th Picture Coding Symp, San Jose CA, Dec. 2013, pp. 137-140.
Sezer, O.G., et al., "Approximation and Compression with Sparse Orthonormal Transforms", IEEE Transactions on Image Processing, vol. 24, No. 8, Aug. 2015, pp. 2328-2343.
Egilmez, H., et al., "Graph-Based Transforms for Inter Predicted Video Coding" in Proc IEEE int. Conf. Image Process., Quebec City, Canada, Sep. 2015, pp. 3992-3996.
Doganata, Z., et al., "General Synthesis Procedures for FIR Lossless Transfer Matrices, for Perfect-Reconstruction Multirate Filter Bank Applications", IEEE Transactions on Acoustics, Speech, and Signal Processing, vol. 36, No. 10, Oct. 1988, pp. 1561-1574.
P.P Vaidyanathan., "14.6.1 Factorization of Real Unitary Matrices Using Givens Rotations," Chapter 14, Multirate Systems and Filter Banks, Prentice Hall Signal Processing Series, 1993, pp. 747-750.
Alshina E., et al., "Description of Exploration Experiments on Coding Tools", Joint Video Exploration Team (JVET) of ITU-T SG16 WP3 and ISO/IEC JTC1/SC29/WG11 2nd Meeting: San Diego, USA, Feb. 20-26, 2016, JVET-B1011, Feb. 26, 2016, 5 pp.
Huang H., et al., "EE2.1: Quadtree plus binary tree structure integration with JEM tools", Joint Video Exploration Team (JVET) of ITU-T SG16 WP3 and ISO/IEC JTC1/SC29/WG11 3rd Meeting: Geneva, CH, May 26-Jun. 1, 2016, JVET-C0024, May 16, 2016, 5 pp.
Suehring, K., et al., "JVET common test conditions and software reference configurations", Joint Video Exploration Team (JVET) of ITU-T SG16 WP3 and ISO/IEC JTC1/SC29/WG11 2nd Meeting: San Diego, USA Feb. 20-26, 2017, JVET-B1010, Apr. 4, 2016, 4 pp.
Zhao X., et al., "EE2.7 related: Improved non-separable secondary transform", Joint Video Exploration Team (JVET) of ITU-T SG16 WP3 and ISO/IEC JTC1/SC29/WG11 3rd Meeting: Geneva, CH, May 26-Jun. 1, 2016, JVET-C0063, May 17, 2016, 3 pp.
Alshina E., et al., "Description of Exploration Experiments on Coding Tools", Joint Video Exploration Team (JVET) of ITU-T SG16 WP3 and ISO/IEC JTC1/SC29/WG11 3rd Meeting: Geneva, CH, May 26-31, 2016, JVET-C1011, May 31, 2016, 9 pp.
International Preliminary Report on Patentability—PCT/US2017/017944, The International Bureau of WIPO—Geneva, Switzerland, dated May 9, 2018, 24 pages.
Response to Written Opinion dated Apr. 12, 2017, from International Application No. PCT/US2017/017944, filed on Dec. 15, 2017, 26 pp.
Second Written Opinion from International Application No. PCT/US2017/017944, dated Jan. 26, 2018, 12 pp.

EFFICIENT PARAMETER STORAGE FOR COMPACT MULTI-PASS TRANSFORMS

This application claims the benefit of U.S. Provisional Patent Application 62/295,448, filed Feb. 15, 2016, and U.S. Provisional Patent Application 62/295,456, filed Feb. 15, 2016, the entire content of each of which is incorporated herein by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs) and/or coding nodes. Pictures may be referred to as frames, and reference pictures may be referred to as reference frames.

Spatial or temporal prediction results in a predictive block for a block to be coded. Residual data represents pixel differences between the original block to be coded and the predictive block. For further compression, the residual data may be transformed from the pixel domain to a transform domain, resulting in residual transform coefficients, which then may be quantized. Entropy coding may be applied to achieve even more compression.

SUMMARY

In general, the disclosure describes techniques for compact multi-pass transform (CMPT) coding. Transform coding is a part of video coding, such as in the latest standard, High-Efficiency Video Coding (HEVC). The standard may use block transforms that are separable (e.g., horizontal transform and then vertical transform, or vice-versa) and fixed per block size, thus using little memory for implementation.

It may be possible to improve compression using a plurality of sets of non-separable transforms, with compression improvements dependent on the number of available transforms. Having many sets of non-separable transforms may result in having to use too much expensive fast memory to store the parameters defining all those transforms in matrix format. This disclosure describes example techniques for replacing matrix-based transforms. Rather than using matrix-based transforms, this disclosure uses CMPT, which can, in general terms, use less memory and computation as compared to transforms in matrix format. This disclosure describes examples of techniques to further reduce those memory requirements.

In one example, this disclosure describes a method of decoding video data, the method comprising: determining a Compact Multi-Pass Transform (CMPT) from a plurality of CMPTs; decompressing CMPT parameters for the CMPT; applying the CMPT to a coefficient block to reconstruct a residual block, wherein applying the CMPT comprises applying a plurality of transform passes, wherein input of each transform pass of the plurality of transform passes other than an initial transform pass of the plurality of transform passes comprises output of a previous transform pass of the plurality of transform passes, the CMPT parameters for the CMPT comprise respective parameter vectors for each respective transform pass of the plurality of transform passes, for each respective transform pass of the plurality of transform passes, the respective transform pass includes parallel performance of a respective set of Givens rotations, each respective Givens rotation of the respective set of Givens rotations taking two input values of the input of the respective pass and outputting two output values of output of the respective transform pass, wherein factors used for transformation in the respective Givens rotation are defined by a sine and cosine of a respective angle θ for the respective Givens rotation, the sine and cosine of the respective angle θ for the respective Givens rotation correspond to respective CMPT parameters in the parameter vector for the respective transform pass; and decoding, based on a predictive block and the residual block, a current block of a picture of the video data.

In another example, this disclosure describes a method of encoding video data, the method comprising: generating a residual block based on differences between samples of a predictive block and samples of an original block of a picture of the video data being encoded; determining a Compact Multi-Pass Transform (CMPT) from a plurality of CMPTs; decompressing CMPT parameters for the CMPT; applying the CMPT to the residual block to construct a coefficient block, wherein applying the CMPT comprises applying a plurality of transform passes; input of each transform pass of the plurality of transform passes other than an initial transform pass of the plurality of transform passes comprises output of a previous transform pass of the plurality of transform passes, the CMPT parameters for the CMPT comprise respective parameter vectors for each respective transform pass of the plurality of transform passes, for each respective transform pass of the plurality of transform passes, the respective transform pass includes parallel performance of a respective set of Givens rotations, each respective Givens rotation of the respective set of Givens rotations taking two input values of the input of the respective pass and outputting two output values of output of the respective transform pass, wherein factors used for transformation in the respective Givens rotation are defined by a sine and cosine of a respective angle θ for the respective Givens rotation, the sine and cosine of the respective angle θ for the respective Givens rotation correspond to respective CMPT parameters in the parameter vector for the respective transform pass; and generating, for output, information indicating coefficient values for the coefficient block.

In another example, this disclosure describes a device for decoding video data, the device comprising: a data storage medium configured to store the video data; and a video decoder configured to: determine a Compact Multi-Pass Transform (CMPT) from a plurality of CMPTs; decompress CMPT parameters for the CMPT; apply the CMPT to a coefficient block to reconstruct a residual block, wherein the video decoder is configured such that, as part of applying the CMPT, the video decoder applies a plurality of transform passes, wherein: inputs of each transform pass of the plurality of transform passes other than an initial transform pass of the plurality of transform passes comprises output of a previous transform pass of the plurality of transform passes, the CMPT parameters for the CMPT comprise respective parameter vectors for each respective transform pass of the plurality of transform passes, for each respective transform pass of the plurality of transform passes, the respective transform pass includes parallel performance of a respective set of Givens rotations, each respective Givens rotation of the respective set of Givens rotations taking two input values of the input of the respective pass and outputting two output values of output of the respective transform pass, wherein factors used for transformation in the respective Givens rotation are defined by a sine and cosine of a respective angle θ for the respective Givens rotation, the sine and cosine of the respective angle θ for the respective Givens rotation correspond to respective CMPT parameters in the parameter vector for the respective transform pass; and decode, based on a predictive block and the residual block, a current block of a picture of the video data.

In another example, this disclosure describes a device for encoding video data, the device comprising: a memory configured to store the video data; and a video encoder configured to: generate a residual block based on differences between samples of a predictive block and samples of an original block of a picture of the video data being encoded; determine a Compact Multi-Pass Transform (CMPT) from a plurality of CMPTs; decompress CMPT parameters for the CMPT; apply the CMPT to the residual block to construct a coefficient block, wherein the video encoder is configured such that, as part of applying the CMPT, the video encoder applies a plurality of transform passes, wherein: input of each transform pass of the plurality of transform passes other than an initial transform pass of the plurality of transform passes comprises output of a previous transform pass of the plurality of transform passes, the CMPT parameters for the CMPT comprise respective parameter vectors for each respective transform pass of the plurality of transform passes, for each respective transform pass of the plurality of transform passes, the respective transform pass includes parallel performance of a respective set of Givens rotations, each respective Givens rotation of the respective set of Givens rotations taking two input values of the input of the respective pass and outputting two output values of output of the respective transform pass, wherein factors used for transformation in the respective Givens rotation are defined by a sine and cosine of a respective angle θ for the respective Givens rotation, the sine and cosine of the respective angle θ for the respective Givens rotation correspond to respective CMPT parameters in the parameter vector for the respective transform pass; and generate, for output, information indicating coefficient values for the coefficient block.

The details of one or more examples are set forth in the accompanying drawings and the description below. Other features, objects, and advantages will be apparent from the description, drawings, and claims.

DETAILED DESCRIPTION

This disclosure describes techniques that may solve a problem with the advanced application of transform coding, which is a fundamental part of video compression standards. The techniques of this disclosure may reduce memory and computation for large numbers of non-separable transforms, potentially enabling coding gains with reasonable costs. In the past, several data-adaptive transform techniques had been proposed for video coding, showing coding gains, but with prohibitive complexity. The techniques of this disclosure may reduce memory needed, potentially with little performance loss.

For instance, a video coder (e.g., a video encoder or video decoder) may determine a Compact Multi-Pass Transform (CMPT) from a plurality of CMPTs. Additionally, the video coder may decompress CMPT parameters for the CMPT. The video coder may apply the CMPT to an input block (e.g., a coefficient block or residual block) to construct an output block (e.g., a residual block or a coefficient block). As part of applying the CMPT, the video coder applies a plurality of transform passes. Furthermore, input of each transform pass of the plurality of transform passes other than an initial transform pass of the plurality of transform passes comprises output of a previous transform pass of the plurality of transform passes. The CMPT parameters for the CMPT comprise respective parameter vectors for each respective transform pass of the plurality of transform passes. Additionally, for each respective transform pass of the plurality of transform passes, the respective transform pass includes parallel performance of a respective set of Givens rotations, each respective Givens rotation of the respective set of Givens rotations taking two input values of the input of the respective pass and outputting two output values of output of the respective transform pass. Factors used for transformation in the respective Givens rotation are defined by a sine and cosine of a respective angle θ for the respective Givens rotation. The sine and cosine of the respective angle θ for the respective Givens rotation correspond to respective CMPT parameters in the parameter vector for the respective transform pass.

Figure 1:
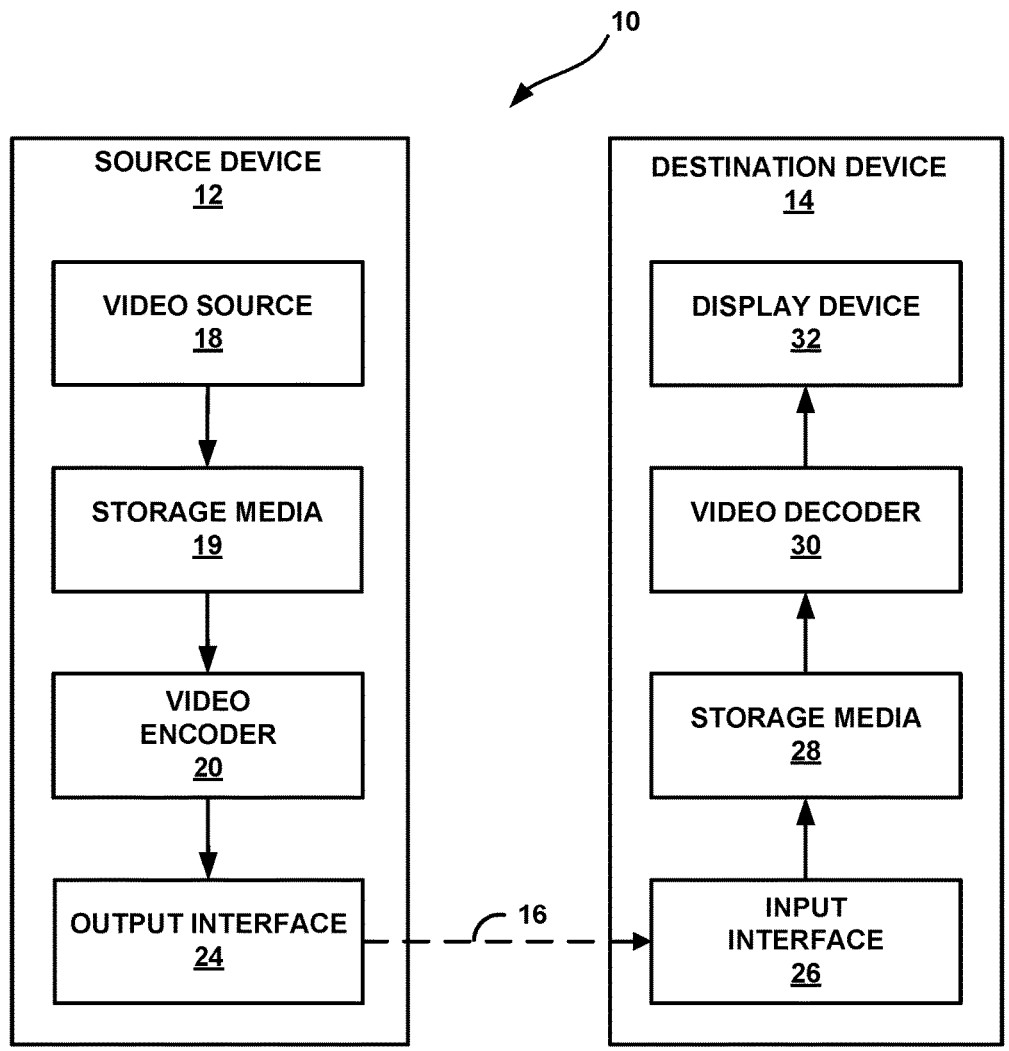
FIG. 1 is a block diagram illustrating an example video encoding and decoding system configured to implement techniques of the disclosure.

FIG. 1 is a block diagram illustrating an example video encoding and decoding system 10 that may utilize techniques of this disclosure. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, tablet computers, televisions, cameras, display devices, digital media players, video gaming consoles, video streaming devices, or the like. In some cases, source device 12 and destination device 14 may be equipped for wireless communication. Thus, source device 12 and destination device 14 may be wireless communication devices. Source device 12 is an example video encoding device (i.e., a device for encoding video data). Destination device 14 is an example video decoding device (i.e., a device for decoding video data).

In the example of FIG. 1, source device 12 includes a video source 18, a storage medium 19 configured to store video data, a video encoder 20, and an output interface 24. Destination device 14 includes an input interface 26, a storage medium 28 configured to store encoded video data, a video decoder 30, and display device 32. In other examples, source device 12 and destination device 14 include other components or arrangements. For example, source device 12 may receive video data from an external video source, such as an external camera. Likewise, destination device 14 may interface with an external display device, rather than including an integrated display device.

The illustrated system 10 of FIG. 1 is merely one example. Techniques for processing video data may be performed by any digital video encoding and/or decoding device. Although generally the techniques of this disclosure are performed by a video encoding device, the techniques may also be performed by a video encoder/decoder, typically referred to as a "CODEC." Source device 12 and destination device 14 are merely examples of such coding devices in which source device 12 generates coded video data for transmission to destination device 14. In some examples, source device 12 and destination device 14 may operate in a substantially symmetrical manner such that each of source device 12 and destination device 14 include video encoding and decoding components. Hence, system 10 may support one-way or two-way video transmission between source device 12 and destination device 14, e.g., for video streaming, video playback, video broadcasting, or video telephony.

Video source 18 of source device 12 may include a video capture device, such as a video camera, a video archive containing previously captured video, and/or a video feed interface to receive video data from a video content provider. As a further alternative, video source 18 may generate computer graphics-based data as the source video, or a combination of live video, archived video, and computer-generated video. Source device 12 may comprise one or more data storage media (e.g., storage media 19) configured to store the video data. The techniques described in this disclosure may be applicable to video coding in general, and may be applied to wireless and/or wired applications. In each case, the captured, pre-captured, or computer-generated video may be encoded by video encoder 20. Output interface 24 may output the encoded video information to a computer-readable medium 16.

Destination device 14 may receive the encoded video data to be decoded via computer-readable medium 16. Computer-readable medium 16 may comprise any type of medium or device capable of moving the encoded video data from source device 12 to destination device 14. In some examples, computer-readable medium 16 comprises a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14. Destination device 14 may comprise one or more data storage media configured to store encoded video data and decoded video data.

In some examples, encoded data may be output from output interface 24 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 26 of destination device 14 receives information from computer-readable medium 16. The information of computer-readable medium 16 may include syntax information defined by video encoder 20 of video encoder 20, which is also used by video decoder 30, that includes syntax elements that describe characteristics and/or processing of blocks and other coded units, e.g., groups of pictures (GOPs). Storage media 28 may store encoded video data received by input interface 26. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 each may be implemented as any of a variety of suitable fixed-function and/or programmable circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

In some examples, video encoder 20 and video decoder 30 may operate according to a video coding standard. Example video coding standards include, but are not limited to, ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-View Video Coding (MVC) extensions. In addition, a new video coding standard, namely High Efficiency Video Coding (HEVC) or ITU-T H.265, including its range and screen content coding extensions, 3D video coding (3D-HEVC) and multiview extensions (MV-HEVC) and scalable extension (SHVC), has recently been developed by the Joint Collaboration Team on Video Coding (JCT-VC) of ITU-T Video Coding Experts Group (VCEG) and ISO/IEC Motion Picture Experts Group (MPEG).

In HEVC and other video coding specifications, a video sequence typically includes a series of pictures. Pictures may also be referred to as "frames." A picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may generate a set of coding tree units (CTUs). Each of the CTUs may comprise a coding tree block of luma samples, two corresponding coding tree blocks of chroma samples, and syntax structures used to code the samples of the coding tree blocks. In monochrome pictures or pictures having three separate color planes, a CTU may comprise a single coding tree block and syntax structures used to code the samples of the coding tree block. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in a raster scan order.

This disclosure may use the term "video unit" or "video block" or "block" to refer to one or more sample blocks and syntax structures used to code samples of the one or more blocks of samples. Example types of video units may include CTUs, CUs, PUs, transform units (TUs), macroblocks, macroblock partitions, and so on. In some contexts, discussion of PUs may be interchanged with discussion of macroblocks or macroblock partitions. Example types of video blocks may include coding tree blocks, coding blocks, and other types of blocks of video data.

To generate a coded CTU, video encoder 20 may recursively perform quad-tree partitioning on the coding tree blocks of a CTU to divide the coding tree blocks into coding blocks, hence the name "coding tree units." A coding block is an N×N block of samples. A CU may comprise a coding block of luma samples and two corresponding coding blocks of chroma samples of a picture that has a luma sample array, a Cb sample array, and a Cr sample array, and syntax structures used to code the samples of the coding blocks. In monochrome pictures or pictures having three separate color planes, a CU may comprise a single coding block and syntax structures used to code the samples of the coding block.

Video encoder 20 may partition a coding block of a CU into one or more prediction blocks. A prediction block is a rectangular (i.e., square or non-square) block of samples on which the same prediction is applied. A prediction unit (PU) of a CU may comprise a prediction block of luma samples, two corresponding prediction blocks of chroma samples, and syntax structures used to predict the prediction blocks. In monochrome pictures or pictures having three separate color planes, a PU may comprise a single prediction block and syntax structures used to predict the prediction block. Video encoder 20 may generate predictive blocks (e.g., luma, Cb, and Cr predictive blocks) for prediction blocks (e.g., luma, Cb, and Cr prediction blocks) of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture that includes the PU. A video coder, such as video encoder 20 or video decoder 30, may perform intra prediction using an intra prediction mode selected from a plurality of available intra prediction modes. The intra prediction modes may include directional intra prediction modes, which may also be referred to as intra prediction directions.

Different directional intra prediction modes correspond to different angles. In some examples, to determine a value of a current sample of a predictive block using a directional intra prediction mode, the video coder may determine a point where a line passing through the current sample at the angle corresponding to the directional intra prediction mode intersects a set of border samples. The border samples may comprise samples in a column immediately left of the predictive block and samples in a row immediately above the predictive block. If the point is between two of the border samples, the video coder may interpolate or otherwise determine a value corresponding to the point. If the point corresponds to a single one of the border samples, the video coder may determine that the value of the point is equal to the border sample. The video coder may set the value of the current sample of the predictive block equal to the determined value of the point.

After video encoder 20 generates predictive blocks (e.g., luma, Cb, and Cr predictive blocks) for one or more PUs of a CU, video encoder 20 may generate one or more residual blocks for the CU. For instance, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the Cb residual block of a CU may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may decompose the residual blocks of a CU into one or more transform blocks. For instance, in HEVC and other video coding specifications, video encoder 20 may use quad-tree partitioning to decompose the residual blocks (e.g., the luma, Cb, and Cr residual blocks) of a CU into one or more transform blocks (e.g., luma, Cb, and Cr transform blocks). A transform block is a rectangular (e.g., square or non-square) block of samples on which the same transform is applied. A transform unit (TU) of a CU may comprise a transform block of luma samples, two corresponding transform blocks of chroma samples, and syntax structures used to transform the transform block samples. Thus, each TU of a CU may have a luma transform block, a Cb transform block, and a Cr transform block. The luma transform block of the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 20 may apply one or more transforms to a transform block of a TU to generate a coefficient block for the TU. For instance, video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients.

Video encoder 20 may output a bitstream that includes a sequence of bits that forms a representation of coded pictures and associated data. Thus, the bitstream comprises an encoded representation of video data. The bitstream may comprise a sequence of network abstraction layer (NAL) units. A NAL unit is a syntax structure containing an indication of the type of data in the NAL unit and bytes containing that data in the form of a raw byte sequence payload (RBSP) interspersed as necessary with emulation prevention bits. Each of the NAL units may include a NAL unit header and may encapsulate a RBSP. The NAL unit header may include a syntax element indicating a NAL unit type code. The NAL unit type code specified by the NAL unit header of a NAL unit indicates the type of the NAL unit. A RB SP may be a syntax structure containing an integer number of bytes that is encapsulated within a NAL unit. In some instances, an RBSP includes zero bits.

Video decoder 30 may receive a bitstream generated by video encoder 20. In addition, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 20. For instance, video decoder 30 may use motion vectors of PUs to determine predictive blocks for the PUs of a current CU. In addition, video decoder 30 may inverse quantize coefficient blocks of TUs of the current CU. Video decoder 30 may perform inverse transforms on the coefficient blocks to reconstruct transform blocks of the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

As noted above, transform coding is used in video coding standards like HEVC. The most recent copy of the HEVC standard is entitled "ITU-T H.265, Series H: Audiovisual and Multimedia Systems, Infrastructure of audiovisual services—Coding of moving video, Advanced video coding for generic audiovisual services, The International Telecommunication Union. October 2014, 540 pp. The following references also discuss the HEVC standard: G. J. Sullivan, J.-R. Ohm, W.-J. Han, and T. Wiegand, "Overview of the High Efficiency Video Coding (HEVC) Standard," *IEEE Trans. Circuits Syst. Video Technol.*, vol. 22, no. 12, pp. 1649-1668, December 2012, and M. Wien, *High Efficiency Video Coding: Coding Tools and Specification*, Springer-Verlag, Berlin, 2015.

It may be possible to improve compression of HEVC and other video coding specifications with use of many sets of non-separable transforms. The following references discuss this point: Y. Ye and M. Karczewicz, "Improved H.264 intra coding based on bi-directional intra prediction, directional transform, and adaptive coefficient scanning," in *Proc. IEEE Int. Conf. Image Process.*, San Diego, Calif., October 2008, pp. 2116-2119; S. Takamura and A. Shimizu, "On intra coding using mode dependent 2D-KLT," in *Proc. 30th Picture Coding Symp.*, San Jose, Calif., December 2013, pp. 137-140; O. G. Sezer, O. G. Guleryuz, and Y. Altunbasak, "Approximation and compression with sparse orthonormal transforms," *IEEE Trans. Image Processing*, pp. 2328-2343, August 2015; and H. E. Egilmez, A. Said, Y.-H. Chao, and A. Ortega, "Graph-based transforms for inter predicted video coding," in *Proc. IEEE Int. Conf. Image Process.*, Quebec City, Canada, September 2015, pp. 3992-3996.

The techniques described in this disclosure are related to compact multi-pass transform (CMPT) that is discussed in more detail in U.S. Provisional Application No. 62/295,440, filed Feb. 15, 2016 and U.S. Provisional Application No. 62/295,448, filed Feb. 15, 2016.

Figure 2B:
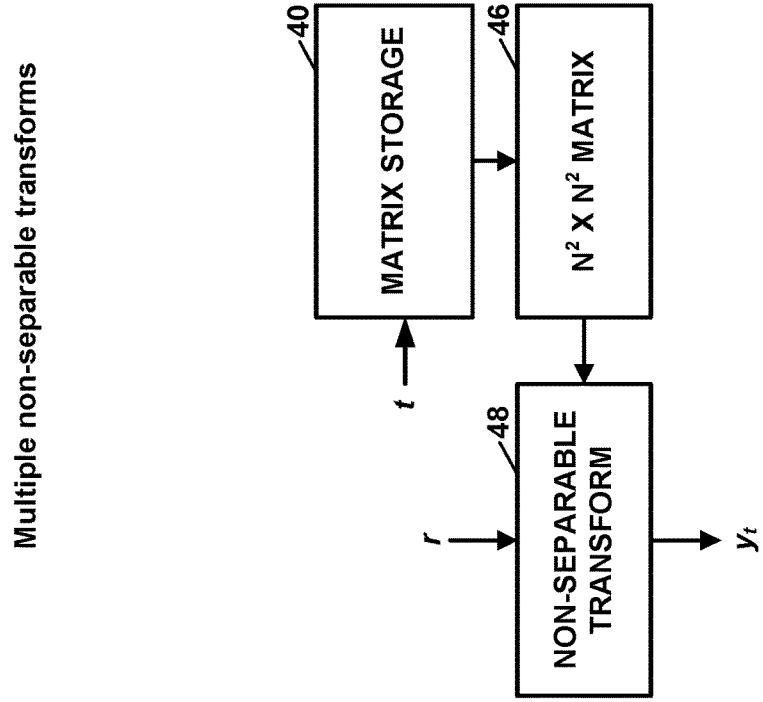
FIGS. 2A and 2B are conceptual diagrams illustrating examples of performing transforms.
Figure 2A:
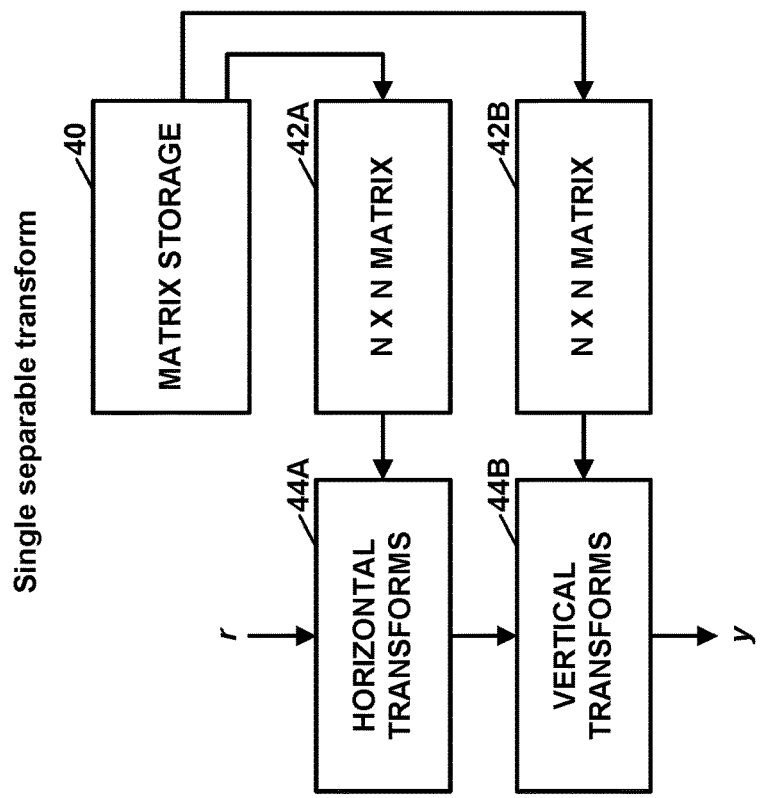

FIGS. 2A and 2B are conceptual diagrams illustrating examples of performing transforms. FIG. 2A shows the type of matrix-based transform that has been extensively used. For instance, the type of matrix-based transform shown in FIG. 2A is used in HEVC. Particularly, in FIG. 2A, video encoder 20 or video decoder 30 (generically referred to as a video coder) stores one or more N×N matrixes in a matrix storage 40. Furthermore, in FIG. 2A, the video coder applies a single separable transform to an input block r consisting of N×N values. In instances where the video coder is encoding video data, the input block may comprise residual samples. In instances where the video coder is decoding video data, the input block may comprise transform coefficients. In FIG. 2A, the video coder retrieves one or more N×N transform matrixes 42A, 42B from matrix storage 40. Furthermore, for each respective row of the input block, the video coder produces a row of an intermediate block by multiplying a vector consisting of elements of the respective row by the N×N transform matrix. In other words, the video coder applies horizontal transforms 44A. For each respective column of the intermediate block, the video coder produces a column of an output blocky by multiplying a vector consisting of elements of the respective column by the N×N transform matrix. In other words, the video coder applies vertical transforms 44B.

FIG. 2B shows the generalization that yields significantly better compression, but since non-separable transforms require a large number of much larger matrices, and thus too much memory, non-separable transforms have not been practical. In the example of FIG. 2B, a video coder determines, based on input t, a transform matrix 46 to retrieve from matrix storage 40. The input t may indicate which transform to apply. For an input block r consisting of N×N values, the transform matrix is $N^2 \times N^2$. To determine an output block $y_t$, the video coder multiplies the input block r by the transform matrix. In this way, the video coder applies a non-separable transform 48.

Figure 3:
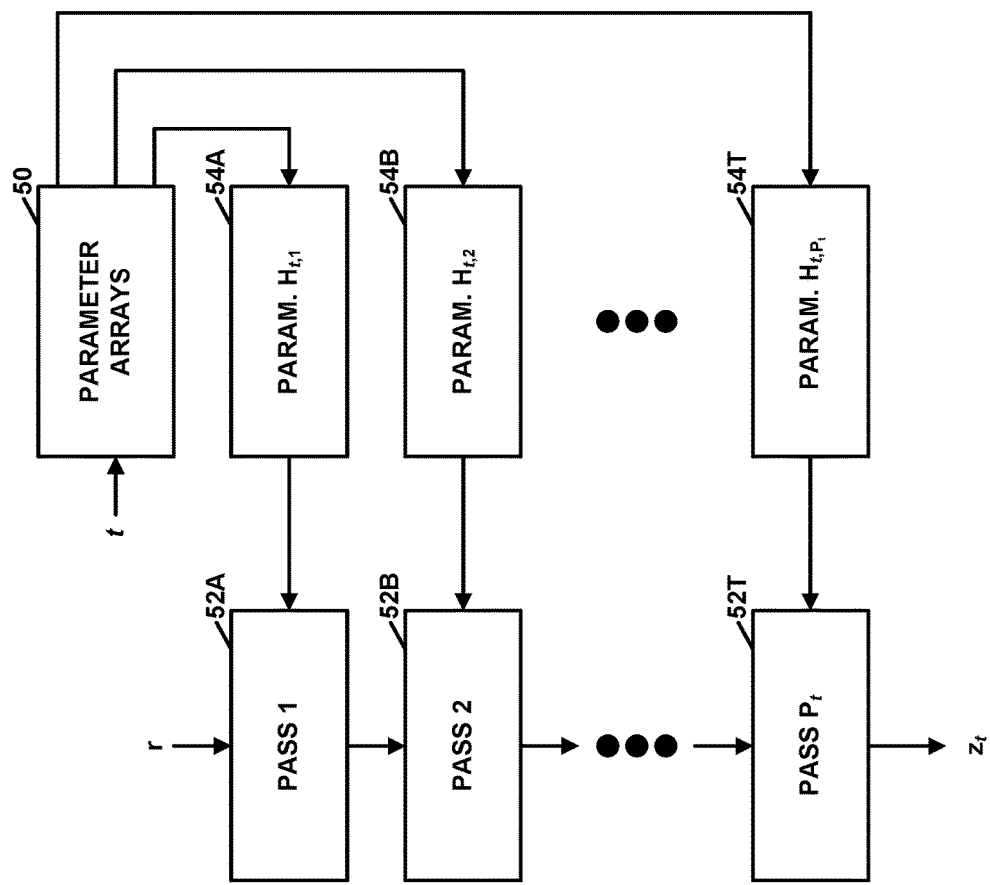
FIG. 3 is a conceptual diagram illustrating an example Compact Multi-Pass Transform implementation, in accordance with a technique of this disclosure.

FIG. 3 is a conceptual diagram illustrating an example Compact Multi-Pass Transform (CMPT) implementation, in accordance with a technique of this disclosure. The CMPT implementation shown in FIG. 3 may enable computing transforms which have, for video compression purposes, nearly the same performance as the matrix-based transforms, but that may use less memory and computations. Particularly, in the example of FIG. 3, a video coder applies a transform to an input block r. In instances where the video coder is encoding video data, the input block may comprise residual samples. In instances where the video coder is decoding video data, the input block may comprise transform coefficients. Furthermore, in the example of FIG. 3, the video coder determines a plurality of parameter arrays (denoted in FIG. 3 as boxes 54A-54T) based on input t. Determining the plurality of parameter arrays is denoted in FIG. 3 as box 50. Input t may indicate which transform to apply. In some examples, input t is an index into a list of transforms. In some examples, input t comprises one or more pieces of data that do not explicitly identify a transform. For instance, input t may comprise one or more of a block size, a prediction mode (e.g., intra or inter prediction), an intra prediction mode, whether the transform is for transforming residual data to transform coefficient, whether the transform is for transforming transform coefficients to residual data, and so on.

In the example of FIG. 3, to apply the transform, the video coder performs a series of passes (i.e., transform passes). The passes are denoted as boxes 52A-52T in FIG. 3. Each respective pass of the series of passes transforms input data based on a respective parameter array of the determined plurality of parameter arrays. The input block r is the input data of the first (i.e., initial) pass of the series of passes. The input data of each pass of the series of passes other than the first pass is the output data of a previous pass of the series of passes. In the first transform pass, the input is the residual block and a first set of parameter values ($h_{t,1}$), in the next transform pass, the input is the output of the first transform pass and a second set of parameter values ($h_{t,2}$), and so forth, for P transform passes. The output of the last pass of the series of passes is the transformed block $z_t$. For instance, if the video coder is encoding video data, the output of the last transform pass is the coefficient block. If the video coder is decoding video data, the output of the last transform pass is a residual block. As described elsewhere in this disclosure, each pass may comprise a set of orthogonal transformations, such as Givens orthogonal transforms. The video coder may perform the orthogonal transformations within a pass with concurrent (parallel) computations. For instance, sets of independent Givens transforms can be computed concurrently using several processors.

The example techniques illustrated in FIGS. 2A, 2B, and 3 may be implemented by a transform processing unit of video encoder 20 to transform a residual block into a coefficient block. In the reverse, an inverse-transform processing unit of video decoder 30 may perform the inverse-transform (e.g., inverse process) of that illustrated in FIGS. 2A, 2B, and 3 to convert the coefficient block back to a residual block.

Also, although the above description described transform processing unit of video encoder 20 performing the features, the inverse-transform processing unit of video decoder 30 may perform the similar features. For example, in the first inverse-transform pass, the input is the coefficient block and a first set of parameter values, in the next inverse-transform pass, the input is the output of the first inverse-transform pass and a second set of parameter values, and so forth for P inverse-transform passes. The output of the last inverse-transform pass is the residual block.

The parameter values used by either of the transform processing unit or the inverse-transform processing unit may be stored as parameter arrays, and for each transform type and each residual block size, there exists sets of parameter values. The number of passes may be equal to the square root of the number of values in a residual block. For large block sizes, the amount of data that needs to be stored may become large, requiring expensive memory that allows for fast retrieval to store such parameter data. This disclosure describes example techniques to reduce the amount of data that needs to be stored and/or increase the ability to retrieve the data quickly.

Figure 4:
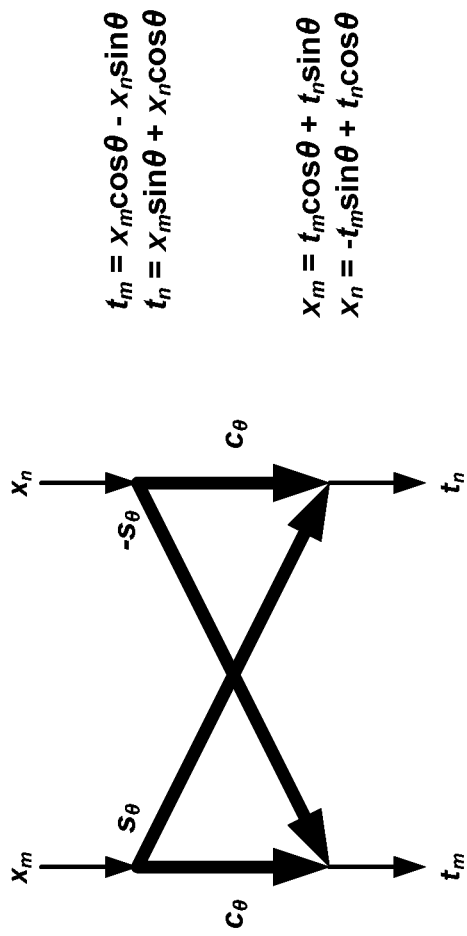
FIG. 4 is a "butterfly" diagram representing a Givens orthogonal transformation, parameterized by angle θ, applied to a pair of vector elements, and the transformation equations, in accordance with a technique of this disclosure.

As noted above, a CMPT may be implemented with series of parallel Givens rotations. FIG. 4 is a "butterfly" diagram representing a Givens orthogonal transformation (i.e., a Givens rotation), parameterized by angle θ, applied to a pair of vector elements, and the transformation equations, in accordance with a technique of this disclosure. It should be understood that Givens rotations are provided merely as one example and should not be considered limiting unless otherwise noted. For instance, instead of the Givens transforms that are applied to pairs of numbers, orthogonal transforms can be applied to groups of four numbers, using 4×4 matrices, or groups of eight numbers using 8×8 matrices. The techniques can be similarly extended to other examples for CMPT processes.

The butterfly diagram illustrates one example computation of one pass. For example, in the first transform pass for a 4×4 residual block, there may be eight implementations of the butterfly diagram. For instance, $x_m$ and $x_n$ are inputs and $t_m$ and $t_n$ are outputs that pass to the next transform pass. As illustrated, $t_m = x_m * \cos(\theta) - x_n * \sin(\theta)$, and $t_n = x_m * \sin(\theta) + x_n * \cos(\theta)$. $t_m$ and $t_n$ are then $x_m$ and $x_n$, respectively, for the next transform pass. In this example, $\sin(\theta)$ and $\cos(\theta)$ are parameter values (i.e., CMPT parameters). Thus, the factors used for transformation in each Givens rotation are defined by the sine and cosine of an angle θ. For the first pass, there may be a plurality of θ values (e.g., eight for a 4×4 residual block). For calculating an inverse transform, $x_m$ and $x_n$ may be determined as follows: $x_m = t_m * \cos(\theta) + t_n * \sin(\theta)$, and $x_n = -t_m * \sin(\theta) + t_n * \cos(\theta)$.

Figure 5:
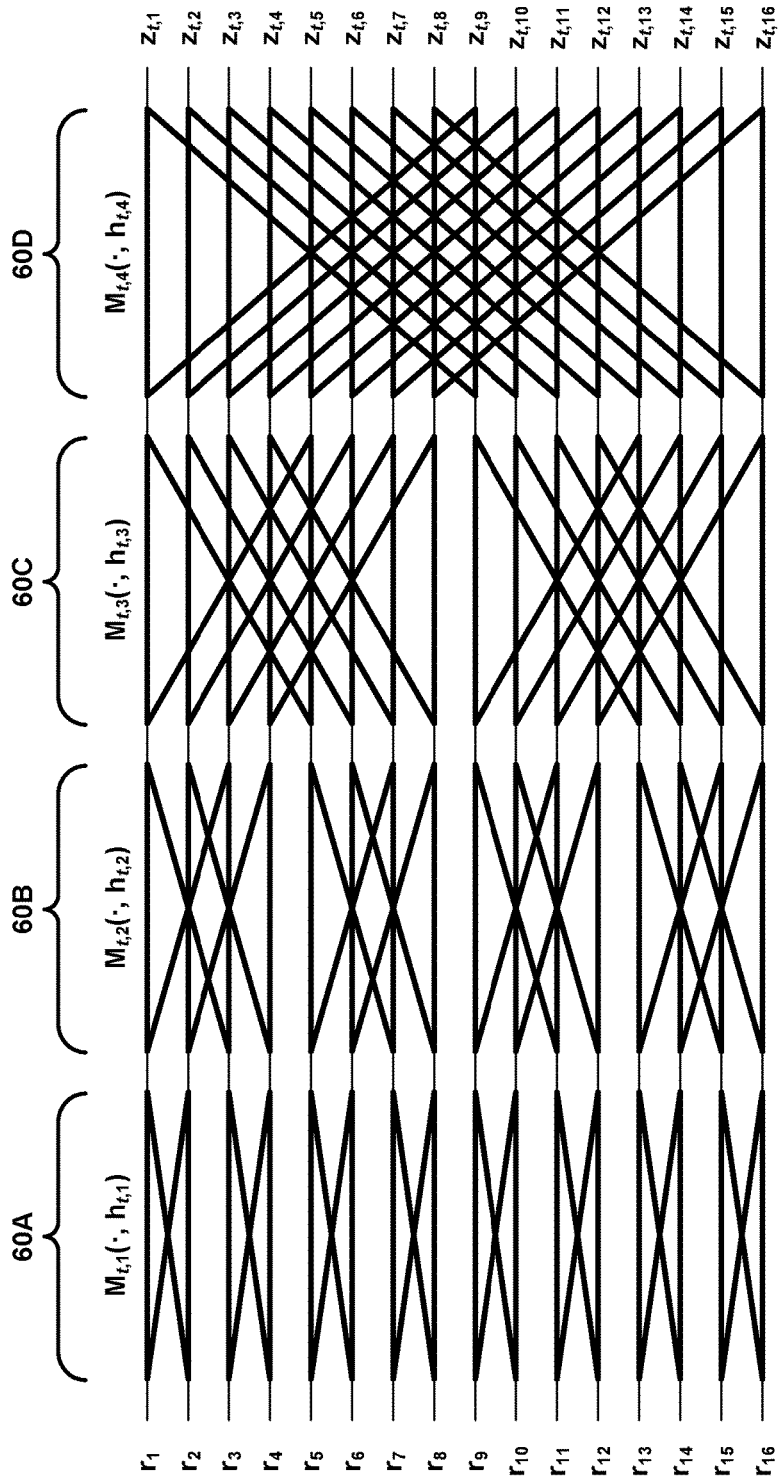
FIG. 5 is a diagram of a Compact Multi-Pass Transform implementation using sequences of parallel Givens rotation on vectors of dimension 16.

FIG. 5 is a diagram of a CMPT implementation using sequences of parallel Givens rotation on vectors of dimension 16. The Givens rotations are parallel in the sense that the Givens rotations applied within one pass can be applied in parallel. Those Givens rotations can be arranged sequentially accordingly, for instance, to a hypercube topology, as shown in FIG. 5. The transform of FIG. 5 can be considered to have a hypercube topology in the sense that each of inputs $r_1 \ldots r_{16}$ may be considered a separate dimension. The example of FIG. 5 is a case that obtains the memory and operations complexity as show in the last row of Table I, which is presented below. In the example of FIG. 5, the CMPT includes four passes, 60A, 60B, 60C, and 60D. However, in other examples, other numbers of passes are possible.

In the example of FIG. 5, the parameter vectors $h_{t,p}$ may contain the different values of $\sin(\theta) \cos(\theta)$ to be used by each butterfly, in the corresponding pass. For example, the parameter vector $h_{t,1}$ may be {sin(0°), cos(0°), sin(20°), cos(20°), sin(40°), cos(40°), sin(60°), cos(60°), sin(80°), cos(80°), sin(100°), cos(100°), sin(120°), cos(120°), sin(140°), cos(140°)}, the parameter vector $h_{t,2}$ may be {sin (5°), cos(5°), sin(25°), cos(25°), sin(45°), cos(45°), sin(65°), cos(65°), sin(85°), cos(85°), sin(105°), cos(105°), sin(125°), cos(125°), sin(145°), cos(145°)}, and so on.

In some examples, video encoder 20 and video decoder 30 may use, and in some instances store, different parameter vectors for different transformations, different block sizes, and different passes. For example, video encoder 20 and video decoder 30 may use parameter vectors {sin(0°), cos (0°), sin(20°), cos(20°), sin(40°), cos(40°), sin(60°), cos (60°)} and {sin(5°), cos(5°), sin(25°), cos(25°), sin(45°), cos(45°), sin(65°), cos(65°)} with 8×8 blocks. Furthermore, in this example, video encoder 20 and video decoder 30 may use parameter vectors {sin(2°), cos(2°), sin(22°), cos(22°), sin(42°), cos(42°), sin(62°), cos(62°), sin(82°), cos(82°), sin(102°), cos(102°), sin(122°), cos(122°), sin(142°), cos (142°)}, {sin(5°), cos(5°), sin(25°), cos(25°), sin(45°), cos (45°), sin(65°), cos(65°), sin(85°), cos(85°), sin(105°), cos (105°), sin(125°), cos(125°), sin(145°), cos(145°)}, {sin (7°), cos(7°), sin(27°), cos(27°), sin(47°), cos(47°), sin(67°), cos(67°), sin(87°), cos(87°), sin(107°), cos(107°), sin(127°), cos(127°), sin(147°), cos(147°)}, and {sin(0°), cos(0°), sin (20°), cos(20°), sin(40°), cos(40°), sin(60°), cos(60°), sin (80°), cos(80°), sin(100°), cos(100°), sin(120°), cos(120°), sin(140°), cos(140°)} with 16×16 blocks.

In the example of FIG. 5, each butterfly corresponds to a Givens rotation of the type shown in FIG. 4. Thus, in the example of FIG. 5, in each pass, eight Givens rotations are performed (e.g., in parallel using several processors or specialized circuitry). For each respective pass p, each of the Givens rotations in the respective pass may use two different CMPT parameters (e.g., $\sin(\theta)$ and $\cos(\theta)$) from the parameter vector for the respective pass ($h_{t,p}$). For example, for the top-left butterfly of FIG. 5, if the first parameter value in a parameter vector for round 1 (i.e., $h_{1,1}$) is equal to 45°, the outputs of the top-left butterfly are equal to)cos(45°)$r_1$−sin (45°)$r_2$ and cos(45°)$r_2$+sin(45°)$r_1$.

In FIG. 5, the structure of transformations $M_{t,p}$ (x, $h_{t,p}$), changes with each pass. Thus, different results are obtained if the order of the parameters or transformations is changed. For example, different results may be obtained if the butterflies of pass 2 of FIG. 5 were swapped with the butterflies of pass 1 of FIG. 5.

Video decoder 30 may apply an inverse of the transform used in encoding. For instance, in the example of FIG. 5, $z_{t,1}$ through $z_{t,16}$ may serve as input to the transformation and $r_1$ through $r_{16}$ is output of the transformation. Where Givens orthogonal transformations are used, the inputs of the inverse Givens orthogonal transform are $y_i$ and $y_j$ and the outputs are $r_i$ and $r_j$, and $r_i = \cos(\theta)y_i + \sin(\theta)y_j$; $r_j = \cos(\theta)y_j - \sin(\theta)y_i$.

One objective of CMPT design is to reduce memory requirements for transform computations. Table I, below, shows the computational complexity of the different types of 2-D linear transformations (the last row is explained further below). Since block sizes N are defined as powers of two, i.e., $N = 2^B$, this translates in exponential complexity growth, and that there can be considerable differences between the different transform types.

TABLE I

Memory and arithmetic operations complexity of different types 2-D block transforms ($2^B \times 2^B$ block), and CMPT with P passes.

| Transform type | Memory | Operations | Operations/pixel |
|---|---|---|---|
| Matrix-based, separable | $O(2^{2B+1})$ | $O(2^{3B})$ | $O(2^B)$ |
| Matrix-based, non-separable | $O(2^{4B})$ | $O(2^{4B})$ | $O(2^{2B})$ |
| CMPT, non-separable | $O(P\,2^{2B})$ | $O(P\,2^{2B})$ | $O(P)$ |

The values in Table I are meant to show how the memory requirements grow with block size, since the larger blocks use by far the most memory. In a practical application, not only the rate of growth is considered, but the exact memory requirements. This disclosure describes example techniques to further reduce the practical values of those memory requirements.

Figure 6:
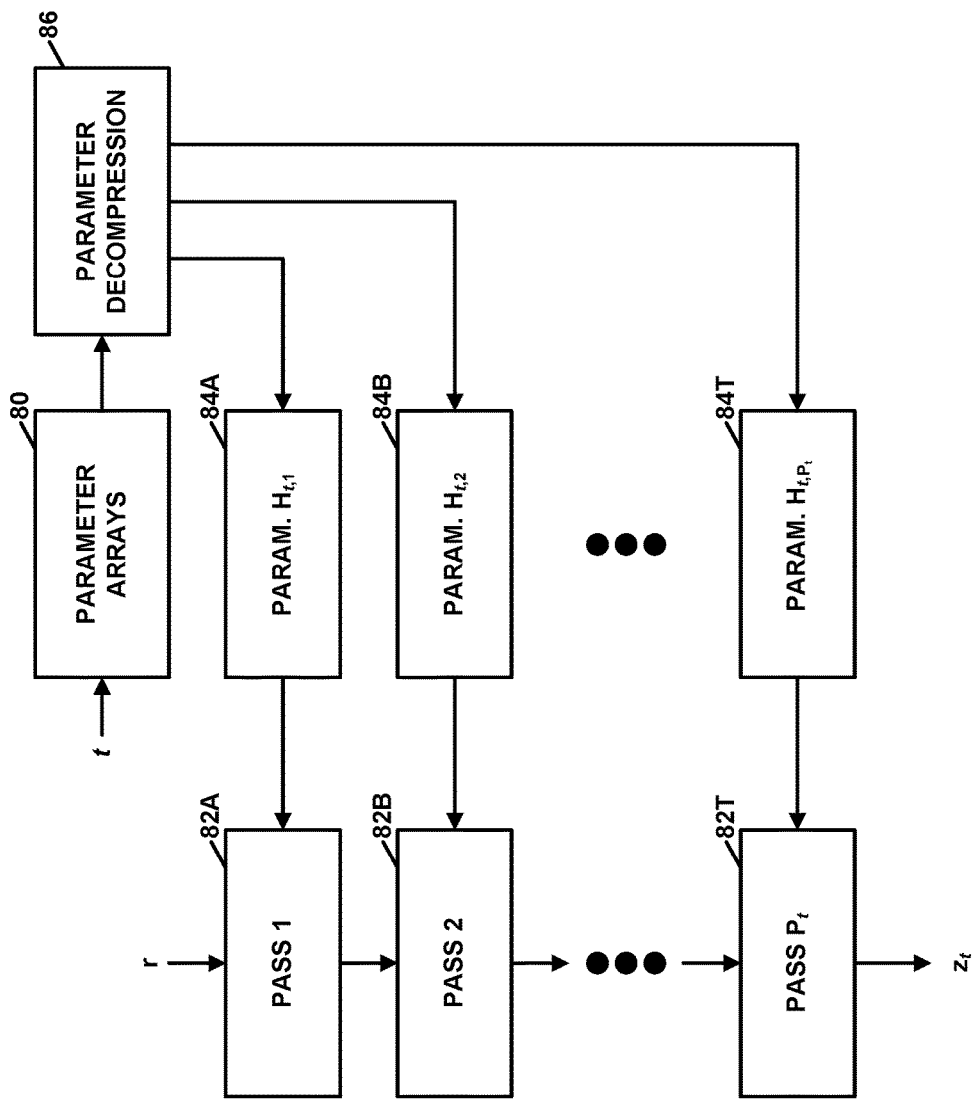
FIG. 6 is a conceptual diagram illustrating an example Compact Multi-Pass Transform implementation with on-the-fly parameter decompression, in accordance with a technique of this disclosure.

FIG. 6 is a conceptual diagram illustrating an example CMPT implementation with on-the-fly parameter decompression, in accordance with a technique of this disclosure. In some examples, a transform processing unit of video encoder 20, an inverse transform processing unit of video encoder 20, or an inverse transform processing unit of video decoder 30 may include a low complexity stage that converts transforms parameters, only when needed, from a compressed format (with examples, described below), into the numbers needed for CMPT computations. The term "compression" here is given a general meaning. For example, in some cases, compression includes avoiding duplicating repeated values.

The example of FIG. 6 is similar to the example of FIG. 3 in that a video coder applies a transform to an input block r to generate an output block $z_t$. Additionally, as in FIG. 3, in the example of FIG. 6, the video coder determines parameter arrays (denoted in FIG. 6 as box 80) based on input t. Furthermore, as in FIG. 3, in the example of FIG. 6, the video coder performs a series of passes (denoted in FIG. 6 as boxes 82A-82T). Each respective pass of the series of passes transforms input data based on a respective parameter array (denoted in FIG. 6 as boxes 84A-84T). However, in the example of FIG. 6, the video coder performs parameter decompression (denoted in FIG. 6 as box 86) to obtain the parameter arrays used in the series of passes. In some examples, the video coder obtains the parameter arrays used in the series of passes based on parameter arrays determined based on input t.

The following describes example techniques for decreasing memory requirements. A first technique provides for a reduction in storage requirements for Givens rotation parameters. A second technique provides for CMPT parameter sharing. A third technique provides for CMPT parameter repetition.

Figure 7:
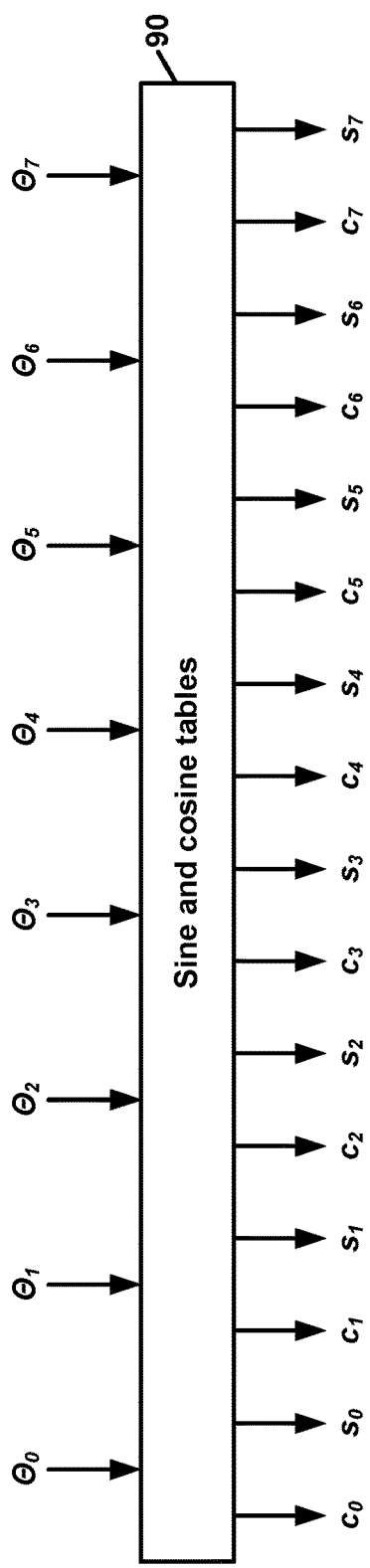
FIG. 7 is a diagram of how a vector of parameters for Givens rotations (the cosines and sines) can be obtained on the fly from a vector of quantized angles.

FIG. 7 is a diagram of how a vector of parameters for Givens rotations (the cosines and sines) can be obtained on the fly from a vector of quantized angles in accordance with the first technique. In other words, FIG. 7 is a diagram of how a vector of parameters for Givens rotations (i.e., CMPT parameters) can be obtained from a vector of quantized angles for use as part of a video encoding or decoding process. Quantization generally refers to a process in which a range of values is compressed to a single value. In this case, individual ranges of angles may be compressed to single values. For instance, quantizing any angle in the range −5° to 5° may result in an angle of 0°. Thus, because the angles are quantized, there is a limited number of possible angles in the vector of quantized angles.

As noted above, the factors used for transformation in each Givens rotation are defined by the sine and cosine of an angle θ. Thus, the sets of all sine and cosine values correspond to the CMPT parameters. However, since the sine and cosine values are not independent, the sine and cosine can be recovered, only when needed, from quantized values of θ, and small tables of sine and cosine values.

For instance, FIG. 7 illustrates an example of a mapping table 90. A video coder may store respective sets of angle values θ for respective passes of a CMPT. Additionally, the video coder may use mapping table 90 to look up a set of sine and cosine values for a pass of a CMPT based on a set of angle values θ for the pass. Although the example of FIG. 7 shows eight angle values θ and sixteen sine and cosine values, other numbers of angle values and sine/cosine values may be used, e.g., for differently sized blocks.

This simple "compression" technique can reduce memory requirements by a factor of two, and is one advantage of using Givens rotations in the CMPT computation. In other words, rather than storing the sine and cosine values for each Givens rotation of each pass of each CMPT, a video coder may simply store the values θ for each pass of each CMPT and use mapping table 90 to determine the sine and cosine values. Hence, the number of stored values of angles θ is less than the number of angle sine and cosine values by a factor of two. The size of mapping table 90 may be relatively small because the angles of θ are quantized and the angles θ used in Givens rotations in a CMPT or in multiple CMPTs may be repeated, especially since the angles θ are quantized.

In some examples, a video coder (e.g., a transform processing unit or inverse-transform processing unit) may determine the θ values (e.g., read the values from memory). Determining the θ values may correspond to box 80 of FIG. 6. However, rather than spending the computations to determine the sine and cosine values based on the determined θ values, the video coder may store the sine and cosine values in a mapping table such as that illustrated in FIG. 7. In the example of FIG. 7, $c_0$ equals $\cos(\theta_0)$ and so equals $\sin(\theta_0)$, $c_1$ equals $\cos(\theta_1)$ and $s_1$ equals $\sin(\theta_1)$, and so forth. Determining the sine and cosine values may correspond to box 86 of FIG. 6. In this case, rather than determining the sine and cosine values computationally, the video coder (e.g., a transform processing unit or the inverse-transform processing unit of the video coder) may determine the sine and cosine values based on mapping table 90 (which may also be called a lookup table). Because the number of possible values of θ may be limited (e.g., due to the θ values being quantized), by using a mapping table computational efficiencies may be gained. With these techniques, the storage is relatively less and reductions computational complexity may be achieved. In this example, parameter values used in the passes are values generated from applying trigonometric functions to parameter data.

It should be understood that video encoder 20 and video decoder 30 may store respective mapping tables. For instance, the mapping table on video encoder 20 is used to perform the transform. The mapping table on video decoder 30 is used to perform the inverse transform.

In accordance with the second technique, for CMPT parameter sharing, in case that a large number of CMPTs (or KLTs) are used, but some CMPTs (or KLTs) are diagonalizing similar correlation matrices, a mechanism is proposed to share the parameters for different CMPTs (or transform matrices for different KLTs), so that the number of total CMPT parameters can be further reduced. For compression purposes, transforms that are "similar" may not necessarily have similar values. Instead, transforms may be considered "similar" if the transforms compress similarly well data sources that have similar types of correlation matrices. For example, two transforms may be "similar" if the two transforms have N passes and exactly the same set of CMPT parameters in the first S passes, and differ only in the remaining N−S passes.

For example, if different CMPT parameters are used for different intra prediction directions, but similar correlation matrices are shown for the neighboring intra prediction directions, the following may be performed: define several principal intra prediction directions. Additionally, in this example, video encoder 20 may explicitly store the CMPT parameters for these principal intra prediction directions, namely principal CMPT parameters. For other non-principal intra prediction directions, video encoder 20 may further store a smaller set of CMPT parameters, namely supplemental CMPT parameters. Then, for applying a transform on the principal intra prediction directions, video encoder 20 may use the corresponding principal CMPT parameters to apply the transform and derive the transform coefficients. For applying a transform on other non-principal intra prediction directions, video encoder 20 may first find the closest principal intra prediction direction. For example, if a non-principal intra prediction direction is 95°, and the set of principal intra prediction directions are those provided in the example above, the closest principal intra prediction direction is the principal intra prediction direction for 90°. Video encoder 20 may then use the corresponding principal CMPT parameters to perform a first transform process, thereby deriving a first group of transform coefficients. Subsequently, video encoder 20 may use the corresponding supplemental CMPT parameters to do a second transform on top of the aforementioned first group of derived transform coefficients, thereby deriving the final transform coefficients. For example, a transform for an intra prediction direction for 90° and a transform for an intra prediction direction for 92° may both have N passes and exactly the same set of CMPT parameters in the first S passes, and differ only in the remaining N−S passes.

Video decoder 30 may perform a similar technique when decoding video data.

Thus, in this example, a video coder may store CMPT parameters of a plurality of CMPTs in a memory, such as storage media 19 (FIG. 1), storage media 28 (FIG. 1), video data memory 101 (FIG. 8), video data memory 151 (FIG. 9), or another memory. Based on the CMPT parameters of a first CMPT including a set of shared CMPT parameters and the CMPT parameters of the second CMPT including the set of shared CMPT parameters, the memory does not store more than one copy of the set of shared CMPT parameters. The plurality of CMPTs may include CMPTs associated with respective principal intra prediction directions in a plurality of principal intra prediction directions. Additionally, in this example, the plurality of CMPTs includes CMPTs associated with respective non-principal intra prediction directions in a plurality of non-principal intra prediction directions. The first CMPT is associated with a particular non-principal intra prediction direction of the plurality of non-principal intra prediction directions. The particular non-principal intra prediction direction is closest to a particular principal intra prediction direction in the plurality of principal intra prediction directions. The second CMPT is associated with the particular principal intra prediction direction.

In the example of the previous paragraph, in instances where the video coder is a video encoder, such as video encoder 20, as part of applying the first CMPT, the video encoder may use the CMPT parameters of the second CMPT to perform a transform process to derive a first group of transform coefficients. Examples of how to use the CMPT parameters of a CMPT to perform the transform process to derive transform coefficients are described elsewhere in this disclosure. Furthermore, the video encoder may use supplemental CMPT parameters to perform a transform on the first group of transform coefficients, thereby deriving final transform coefficients of the coefficient block. The video encoder may use the supplemental CMPT parameters to perform the transform on the first group of transform coefficients in much the same way that the video encoder uses CMPT parameters of CMPTs to derive transform coefficients. The supplemental CMPT parameters may be those parameters of the first CMPT not in the set of shared parameters.

In the example of the previous two paragraphs, in instances where the video coder is a video decoder, such as video decoder 30, as part of applying the second CMPT, the video decoder may use the CMPT parameters of the second CMPT to perform a transform process to derive a first group of residual samples. Examples of how to use the CMPT parameters of a CMPT to perform the transform process to derive residual are described elsewhere in this disclosure. Additionally, the video decoder may use supplemental CMPT parameters to perform a transform on the first group of residual samples, thereby deriving final residual samples of the residual block. The video decoder may use the supplemental CMPT parameters to perform the transform on the first group of residual samples in much the same way that the video decoder uses CMPT parameters of CMPTs to derive residual samples. The supplemental CMPT parameters may be those parameters of the first CMPT not in the set of shared parameters.

In the example of CMPT parameter sharing, the parameter values for one group are based on parameter values for another group. For example, the parameter data values that are stored for a pass (e.g., transform pass or inverse-transform pass) may be the difference between the actual parameter data and the parameter data for a different pass or for a different coding mode. In this example, the transform processing unit or the inverse-transform processing unit may determine the parameter data based on a group of another parameter data.

The above discussed that sets of parameters can be used for more than one transform (in our notation, more than one transform index t). For CMPT parameter repetition, another common case is to have parameters values that are repeated in the parameter vectors $h_{t,p}$ (FIG. 6). For example, the CMPT parameters for a pass of a CMPT may include values $\{x_0, x_1, x_1, x_1, x_2, x_0, x_3, x_4,\}$. In this example, the value $x_1$ is repeated.

Thus, in accordance with the third technique, in this case, special codes can be used to replace the parameter values with data indicating which parameters are repeated, and how many times. Hence, in the example provided in the previous paragraph, the second and third instances of $x_1$ may be replaced with a code indicating $x_1$ is repeated 2 additional times. This technique may be simple enough for real time implementation, but may also yield significant memory reductions. In another example, the video coder may store a mapping from CMPT parameter values to variable length codes. In this example, the video coder may store sequences of variable length codes for passes of the CMPT and may use the mapping to determine the actual CMPT parameter values. As one example, the parameter data may store information indicating that a run of parameter data values is the same, rather than storing the same parameter data values. In this case, to decompress the parameter values, the transform processing unit or inverse-transform processing unit may copy the parameter data based on the determined number of parameter data values being the same.

The repetitions can also exploit the structure of the transforms used by each CMPT pass. For example, with the hypercube structure described in U.S. Provisional Applications Nos. 62/295,440 and 62/295,448, stages can be obtained corresponding to separable transforms by simply repeating transform parameters. For example, the parameter data may store information indicating that a group of parameter data values is the same as the next group of parameter values. In this case, to decompress the parameter values, the transform processing unit or inverse-transform processing unit may copy the parameter data of the group into the next group.

The examples described for compression/decompression such as reductions of Givens rotation parameters, CMPT parameter sharing, and CMPT parameter repetition may be combined together or performed separately. For example, the parameter data may store information indicating repetition (e.g., CMPT parameter repetition) from which transform processing unit and inverse-transform processing unit determine the parameter data. From the parameter data, transform processing unit and inverse-transform processing unit may use the mapping table to determine sine and cosine values needed for each of the passes. As another example, CMPT parameter sharing, CMPT parameter repetition, and reduction of Givens rotation parameters may be used together. In this way, each of these example techniques may provide one degree of compression/decompression, and can be used with the other techniques to provide additional degrees of compression/decompression.

Figure 8:
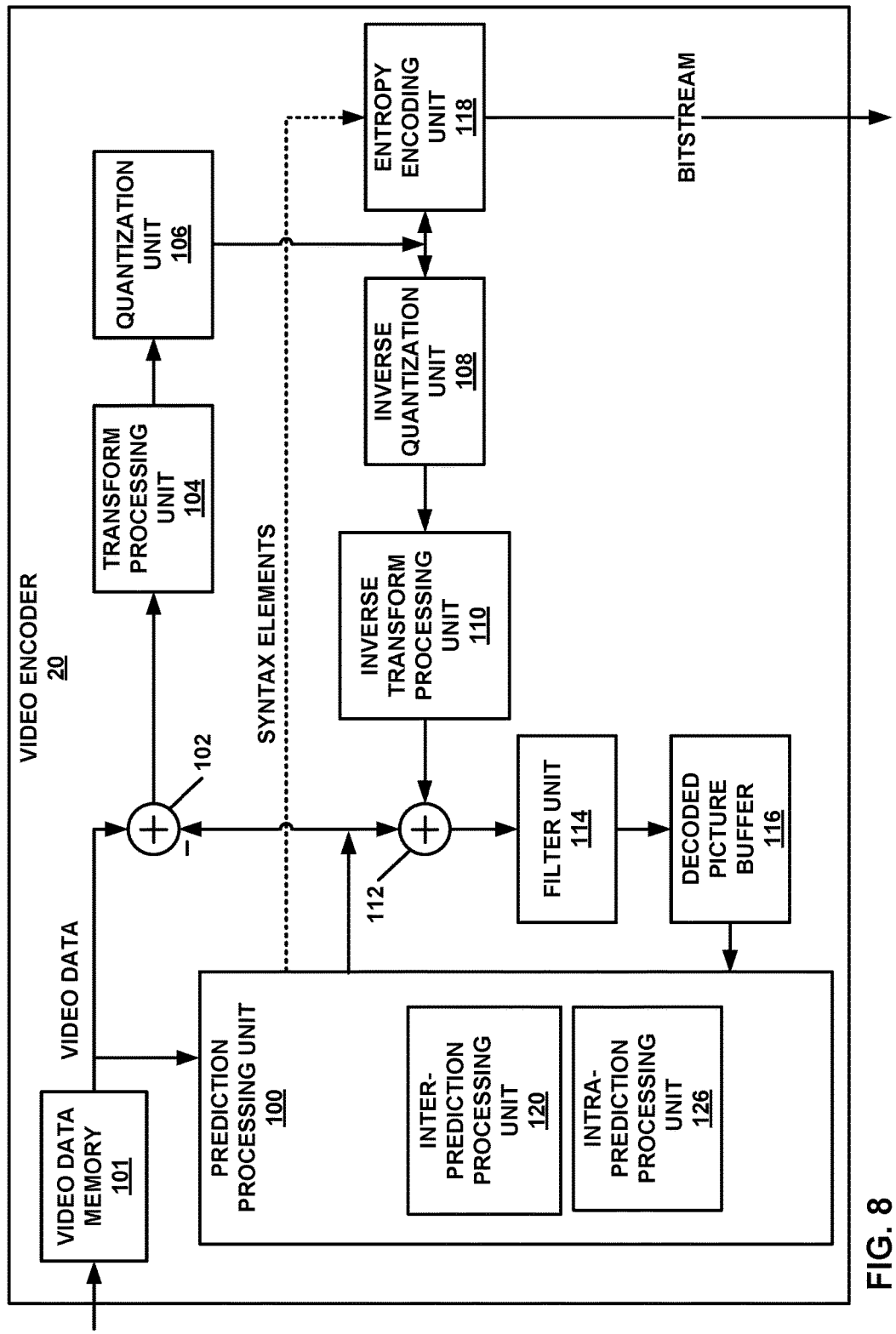
FIG. 8 is a block diagram illustrating an example of a video encoder.

FIG. 8 is a block diagram illustrating an example video encoder 20 that may implement the techniques of this disclosure. FIG. 8 is provided for purposes of explanation and should not be considered limiting of the techniques as broadly exemplified and described in this disclosure. The techniques of this disclosure may be applicable to various coding standards or methods.

Processing circuitry includes video encoder 20, and video encoder 20 is configured to perform one or more of the example techniques described in this disclosure. For instance, video encoder 20 includes integrated circuitry, and the various units illustrated in FIG. 8 may be formed as hardware circuit blocks that are interconnected with a circuit bus. These hardware circuit blocks may be separate circuit blocks or two or more of the units may be combined into a common hardware circuit block. The hardware circuit blocks may be formed as combination of electric components that form operation blocks such as arithmetic logic units (ALUs), elementary function units (EFUs), as well as logic blocks such as AND, OR, NAND, NOR, XOR, XNOR, and other similar logic blocks.

In some examples, one or more of the units illustrated in FIG. 8 may be software units executing on the processing circuitry. In such examples, the object code for these software units is stored in memory. An operating system may cause video encoder 20 to retrieve the object code and execute the object code, which causes video encoder 20 to perform operations to implement the example techniques. In some examples, the software units may be firmware that video encoder 20 executes at startup. Accordingly, video encoder 20 is a structural component having hardware that performs the example techniques or has software/firmware executing on the hardware to specialize the hardware to perform the example techniques.

In the example of FIG. 8, video encoder 20 includes a prediction processing unit 100, video data memory 101, a residual generation unit 102, a transform processing unit 104, a quantization unit 106, an inverse quantization unit 108, an inverse transform processing unit 110, a reconstruction unit 112, a filter unit 114, a decoded picture buffer 116, and an entropy encoding unit 118. Prediction processing unit 100 includes an inter-prediction processing unit 120 and an intra-prediction processing unit 126. Inter-prediction processing unit 120 may include a motion estimation unit and a motion compensation unit (not shown).

Video data memory 101 may be configured to store video data to be encoded by the components of video encoder 20. The video data stored in video data memory 101 may be obtained, for example, from video source 18. Decoded picture buffer 116 may be a reference picture memory that stores reference video data for use in encoding video data by video encoder 20, e.g., in intra- or inter-coding modes. Video data memory 101 and decoded picture buffer 116 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 101 and decoded picture buffer 116 may be provided by the same memory device or separate memory devices. In various examples, video data memory 101 may be on-chip with other components of video encoder 20, or off-chip relative to those components. Video data memory 101 may be the same as or part of storage media 19 of FIG. 1.

Video encoder 20 receives video data. Video encoder 20 may encode each CTU in a slice of a picture of the video data. Each of the CTUs may be associated with equally-sized luma coding tree blocks (CTBs) and corresponding CTBs of the picture. As part of encoding a CTU, prediction processing unit 100 may perform partitioning to divide the CTBs of the CTU into progressively-smaller blocks. The smaller blocks may be coding blocks of CUs. For example, prediction processing unit 100 may partition a CTB associated with a CTU according to a tree structure.

Video encoder 20 may encode CUs of a CTU to generate encoded representations of the CUs (i.e., coded CUs). As part of encoding a CU, prediction processing unit 100 may partition the coding blocks associated with the CU among one or more PUs of the CU. Thus, each PU may be associated with a luma prediction block and corresponding chroma prediction blocks. Video encoder 20 and video decoder 30 may support PUs having various sizes. As indicated above, the size of a CU may refer to the size of the luma coding block of the CU and the size of a PU may refer to the size of a luma prediction block of the PU. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

Inter-prediction processing unit 120 may generate predictive data for a PU by performing inter prediction on each PU of a CU. The predictive data for the PU may include predictive blocks of the PU and motion information for the PU. Inter-prediction processing unit 120 may perform different operations for a PU of a CU depending on whether the PU is in an I slice, a P slice, or a B slice. Intra-prediction processing unit 126 may generate predictive data for a PU by performing intra prediction on the PU. The predictive data for the PU may include predictive blocks of the PU and various syntax elements.

To perform intra prediction on a PU, intra-prediction processing unit 126 may use multiple intra prediction modes to generate multiple sets of predictive data for the PU. Intra-prediction processing unit 126 may use samples from sample blocks of neighboring PUs to generate a predictive block for a PU. The neighboring PUs may be above, above and to the right, above and to the left, or to the left of the PU, assuming a left-to-right, top-to-bottom encoding order for PUs, CUs, and CTUs. Intra-prediction processing unit 126 may use various numbers of intra prediction modes. In some examples, the number of intra prediction modes may depend on the size of the region associated with the PU.

Prediction processing unit 100 may select the predictive data for PUs of a CU from among the predictive data generated by inter-prediction processing unit 120 for the PUs or the predictive data generated by intra-prediction processing unit 126 for the PUs. In some examples, prediction processing unit 100 selects the predictive data for the PUs of the CU based on rate/distortion metrics of the sets of predictive data. The predictive blocks of the selected predictive data may be referred to herein as the selected predictive blocks.

Residual generation unit 102 may generate, based on the coding blocks (e.g., luma, Cb and Cr coding blocks) for a CU and the selected predictive blocks (e.g., predictive luma, Cb and Cr blocks) for the PUs of the CU, residual blocks (e.g., luma, Cb and Cr residual blocks) for the CU. For instance, residual generation unit 102 may generate the residual blocks of the CU such that each sample in the residual blocks has a value equal to a difference between a sample in a coding block of the CU and a corresponding sample in a corresponding selected predictive block of a PU of the CU.

Transform processing unit 104 may perform quad-tree partitioning to partition the residual blocks associated with a CU into transform blocks associated with TUs of the CU. Thus, a TU may be associated with a luma transform block and two chroma transform blocks. The sizes and positions of the luma and chroma transform blocks of TUs of a CU may or may not be based on the sizes and positions of prediction blocks of the PUs of the CU. A quad-tree structure known as a "residual quad-tree" (RQT) may include nodes associated with each of the regions. The TUs of a CU may correspond to leaf nodes of the RQT.

Transform processing unit 104 may generate transform coefficient blocks for each TU of a CU by applying one or more transforms to the transform blocks of the TU. Transform processing unit 104 may apply various transforms to a transform block associated with a TU. For example, transform processing unit 104 may apply a discrete cosine transform (DCT), a directional transform, or a conceptually similar transform to a transform block. In some examples, transform processing unit 104 does not apply transforms to a transform block. In such examples, the transform block may be treated as a transform coefficient block. In accordance with the techniques of this disclosure, transform processing unit 104 may be configured to perform the CMPT process described in this disclosure.

For example, transform processing unit 104 may determine a transform to apply on a residual block (e.g., by testing different transforms) and determine parameter data, stored in video data memory 101, based on the determined transform. Transform processing unit 104 may decompress the parameter data to generate a plurality of sets of parameter values, each set of parameter values including one or more parameters values for a respective transform pass, and apply the transform to the residual block to construct a coefficient block from the residual block by performing a plurality of transform passes, each transform pass utilizing output of a previous transform pass and a set of parameter values, and the first transform pass receiving the residual block.

In one example, to decompress the parameter data, transform processing unit 104 may map each of the parameter data to computational data (e.g., sine and cosine values) based on a mapping table (e.g., mapping table 90 of FIG. 7). In one example, to decompress the parameter data, transform processing unit 104 may determine a number of parameter data that are the same and copy the parameter data based on the determined number. In one example, to decompress the parameter data, transform processing unit 104 may determine a group of parameter data that are the same as a next group of the parameter data and copy the parameter data of the group into the next group. In one example, to determine the parameter data, transform processing unit 104 may determine the parameter data based on another group of parameter data. Transform processing unit 104 may perform any combination of such techniques as well.

Quantization unit 106 may quantize the transform coefficients in a coefficient block. The quantization process may reduce the bit depth associated with some or all of the transform coefficients. For example, an n-bit transform coefficient may be rounded down to an m-bit transform coefficient during quantization, where n is greater than m. Quantization unit 106 may quantize a coefficient block associated with a TU of a CU based on a quantization parameter (QP) value associated with the CU. Video encoder 20 may adjust the degree of quantization applied to the coefficient blocks associated with a CU by adjusting the QP value associated with the CU. Quantization may introduce loss of information. Thus, quantized transform coefficients may have lower precision than the original ones.

Inverse quantization unit 108 and inverse transform processing unit 110 may apply inverse quantization and inverse transforms to a coefficient block, respectively, to reconstruct a residual block from the coefficient block. Reconstruction unit 112 may add the reconstructed residual block to corresponding samples from one or more predictive blocks generated by prediction processing unit 100 to produce a reconstructed transform block associated with a TU. By reconstructing transform blocks for each TU of a CU in this way, video encoder 20 may reconstruct the coding blocks of the CU.

Filter unit 114 may perform one or more deblocking operations to reduce blocking artifacts in the coding blocks associated with a CU. Decoded picture buffer 116 may store the reconstructed coding blocks after filter unit 114 performs the one or more deblocking operations on the reconstructed coding blocks. Inter-prediction processing unit 120 may use a reference picture that contains the reconstructed coding blocks to perform inter prediction on PUs of other pictures. In addition, intra-prediction processing unit 126 may use reconstructed coding blocks in decoded picture buffer 116 to perform intra prediction on other PUs in the same picture as the CU.

Entropy encoding unit 118 may receive data from other functional components of video encoder 20. For example, entropy encoding unit 118 may receive coefficient blocks from quantization unit 106 and may receive syntax elements from prediction processing unit 100. Entropy encoding unit 118 may perform one or more entropy encoding operations on the data to generate entropy-encoded data. For example, entropy encoding unit 118 may perform a CABAC operation, a context-adaptive variable length coding (CAVLC) operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 20 may output a bitstream that includes entropy-encoded data generated by entropy encoding unit 118. For instance, the bitstream may include data that represents a RQT for a CU. In some examples, entropy encoding unit 118 may also generate for output information indicating the transform that was applied or information indicating an inverse-transform that video decoder 30 is to apply.

Figure 9:
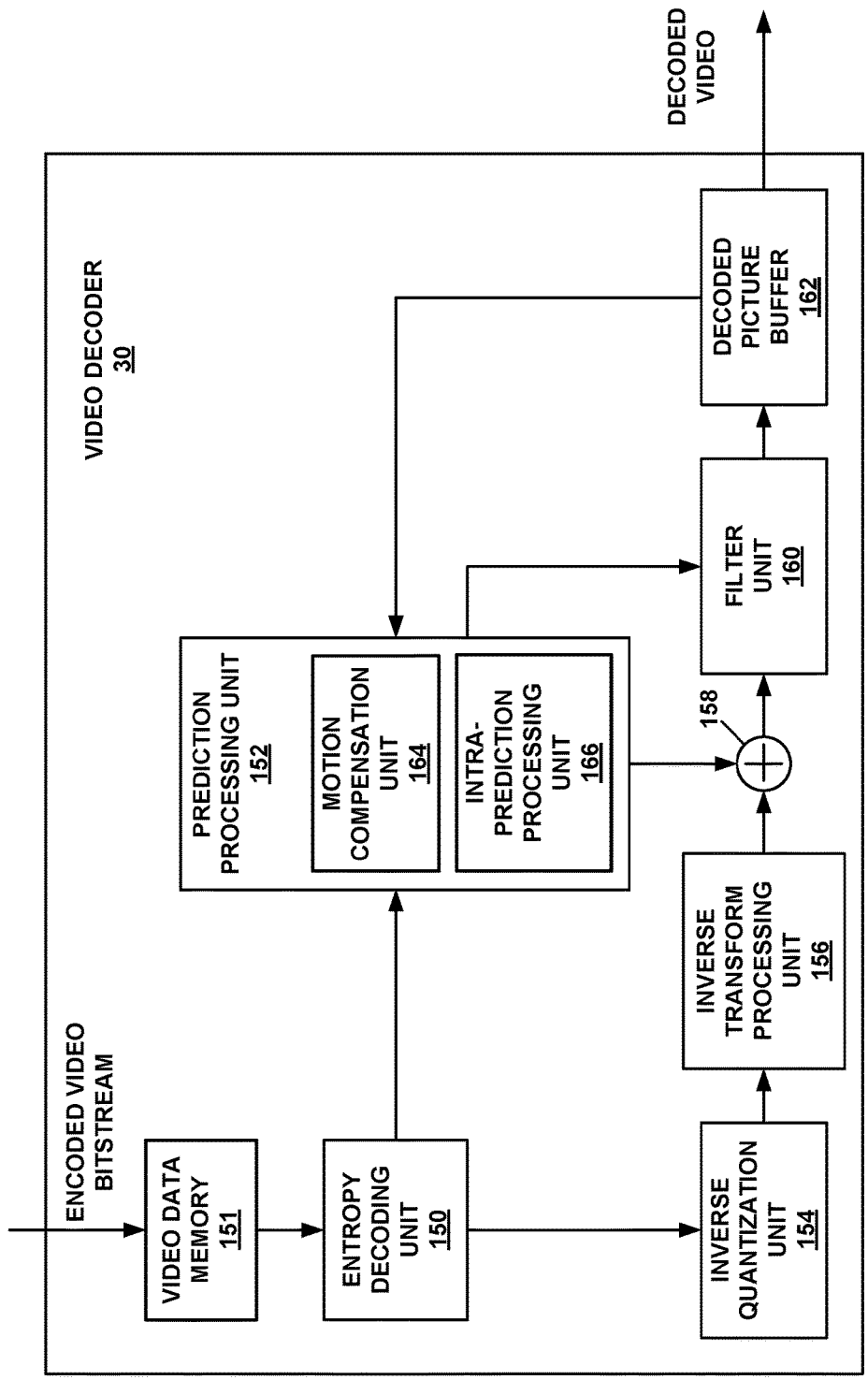
FIG. 9 is a block diagram illustrating an example of a video decoder.

FIG. 9 is a block diagram illustrating an example video decoder 30 that is configured to implement the techniques of this disclosure. FIG. 9 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

Processing circuitry includes video decoder 30, and video decoder 30 is configured to perform one or more of the example techniques described in this disclosure. For instance, video decoder 30 includes integrated circuitry, and the various units illustrated in FIG. 9 may be formed as hardware circuit blocks that are interconnected with a circuit bus. These hardware circuit blocks may be separate circuit blocks or two or more of the units may be combined into a common hardware circuit block. The hardware circuit blocks may be formed as combination of electric components that form operation blocks such as arithmetic logic units (ALUs), elementary function units (EFUs), as well as logic blocks such as AND, OR, NAND, NOR, XOR, XNOR, and other similar logic blocks.

In some examples, one or more of the units illustrated in FIG. 9 may be software units executing on the processing circuitry. In such examples, the object code for these software units is stored in memory. An operating system may cause video decoder 30 to retrieve the object code and execute the object code, which causes video decoder 30 to perform operations to implement the example techniques. In some examples, the software units may be firmware that video decoder 30 executes at startup. Accordingly, video decoder 30 is a structural component having hardware that performs the example techniques or has software/firmware executing on the hardware to specialize the hardware to perform the example techniques.

In the example of FIG. 9, video decoder 30 includes an entropy decoding unit 150, video data memory 151, a prediction processing unit 152, an inverse quantization unit 154, an inverse transform processing unit 156, a reconstruction unit 158, a filter unit 160, and a decoded picture buffer 162. Prediction processing unit 152 includes a motion compensation unit 164 and an intra-prediction processing unit 166. In other examples, video decoder 30 may include more, fewer, or different functional components.

Video data memory 151 may store encoded video data, such as an encoded video bitstream, to be decoded by the components of video decoder 30. The video data stored in video data memory 151 may be obtained, for example, from computer-readable medium 16, e.g., from a local video source, such as a camera, via wired or wireless network communication of video data, or by accessing physical data storage media. Video data memory 151 may form a coded picture buffer (CPB) that stores encoded video data from an encoded video bitstream. Decoded picture buffer 162 may be a reference picture memory that stores reference video data for use in decoding video data by video decoder 30, e.g., in intra- or inter-coding modes, or for output. Video data memory 151 and decoded picture buffer 162 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 151 and decoded picture buffer 162 may be provided by the same memory device or separate memory devices. In various examples, video data memory 151 may be on-chip with other components of video decoder 30, or off-chip relative to those components. Video data memory 151 may be the same as or part of storage media 28 of FIG. 1.

Video data memory 151 receives and stores encoded video data (e.g., NAL units) of a bitstream. Entropy decoding unit 150 may receive encoded video data (e.g., NAL units) from video data memory 151 and may parse the NAL units to obtain syntax elements. Entropy decoding unit 150 may entropy decode entropy-encoded syntax elements in the NAL units. Prediction processing unit 152, inverse quantization unit 154, inverse transform processing unit 156, reconstruction unit 158, and filter unit 160 may generate decoded video data based on the syntax elements extracted from the bitstream. Entropy decoding unit 150 may perform a process generally reciprocal to that of entropy encoding unit 118.

In addition to obtaining syntax elements from the bitstream, video decoder 30 may perform a reconstruction operation on a non-partitioned CU. To perform the reconstruction operation on a CU, video decoder 30 may perform a reconstruction operation on each TU of the CU. By performing the reconstruction operation for each TU of the CU, video decoder 30 may reconstruct residual blocks of the CU.

As part of performing a reconstruction operation on a TU of a CU, inverse quantization unit 154 may inverse quantize, i.e., de-quantize, coefficient blocks associated with the TU. After inverse quantization unit 154 inverse quantizes a coefficient block, inverse transform processing unit 156 may apply one or more inverse transforms to the coefficient block in order to generate a residual block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block. Inverse transform processing unit 156 may be configured to perform the example CMPT process described in this disclosure.

For example, inverse transform processing unit 156 may determine an inverse-transform to apply on a coefficient block (e.g., by receiving an index into a list of transforms or inverse-transforms and determining the inverse-transform to apply based on the received index) and determine parameter data, stored in video data memory 151, based on the determined transform. Inverse transform processing unit 156 may decompress the parameter data to generate a plurality of sets of parameter values, each set of parameter values including one or more parameters values for a respective inverse-transform pass, and apply the inverse-transform to the coefficient block to reconstruct a residual block from the coefficient block by performing a plurality of inverse-transform passes, each inverse-transform pass utilizing output of a previous inverse-transform pass and a set of parameter values, and the first inverse-transform pass receiving the coefficient block.

In one example, to decompress the parameter data, inverse transform processing unit 156 may map each of the parameter data to computational data (e.g., sine and cosine values) based on a mapping table (e.g., FIG. 7). In one example, to decompress the parameter data, inverse transform processing unit 156 may determine a number of parameter data that are the same and copy the parameter data based on the determined number. In one example, to decompress the parameter data, inverse transform processing unit 156 may determine a group of parameter data that are the same as a next group of the parameter data and copy the parameter data of the group into the next group. In one example, to determine the parameter data, inverse transform processing unit 156 may determine the parameter data based on another group of parameter data. Inverse transform processing unit 156 may perform any combination of such techniques as well.

If a PU is encoded using intra prediction, intra-prediction processing unit 166 may perform intra prediction to generate predictive blocks of the PU. Intra-prediction processing unit 166 may use an intra prediction mode to generate the predictive blocks of the PU based on samples spatially-neighboring blocks. Intra-prediction processing unit 166 may determine the intra prediction mode for the PU based on one or more syntax elements obtained from the bitstream.

If a PU is encoded using inter prediction, entropy decoding unit 150 may determine motion information for the PU. Motion compensation unit 164 may determine, based on the motion information of the PU, one or more reference blocks. Motion compensation unit 164 may generate, based on the one or more reference blocks, predictive blocks (e.g., predictive luma, Cb and Cr blocks) for the PU.

Reconstruction unit 158 may use transform blocks (e.g., luma, Cb and Cr transform blocks) for TUs of a CU and the predictive blocks (e.g., luma, Cb and Cr blocks) of the PUs of the CU, i.e., either intra-prediction data or inter-prediction data, as applicable, to reconstruct the coding blocks (e.g., luma, Cb and Cr coding blocks) for the CU. For example, reconstruction unit 158 may add samples of the transform blocks (e.g., luma, Cb and Cr transform blocks) to corresponding samples of the predictive blocks (e.g., luma, Cb and Cr predictive blocks) to reconstruct the coding blocks (e.g., luma, Cb and Cr coding blocks) of the CU.

Filter unit 160 may perform a deblocking operation to reduce blocking artifacts associated with the coding blocks of the CU. Video decoder 30 may store the coding blocks of the CU in decoded picture buffer 162. Decoded picture buffer 162 may provide reference pictures for subsequent motion compensation, intra prediction, and presentation on a display device, such as display device 32 of FIG. 1. For instance, video decoder 30 may perform, based on the blocks in decoded picture buffer 162, intra prediction or inter prediction operations for PUs of other CUs.

Figure 10:
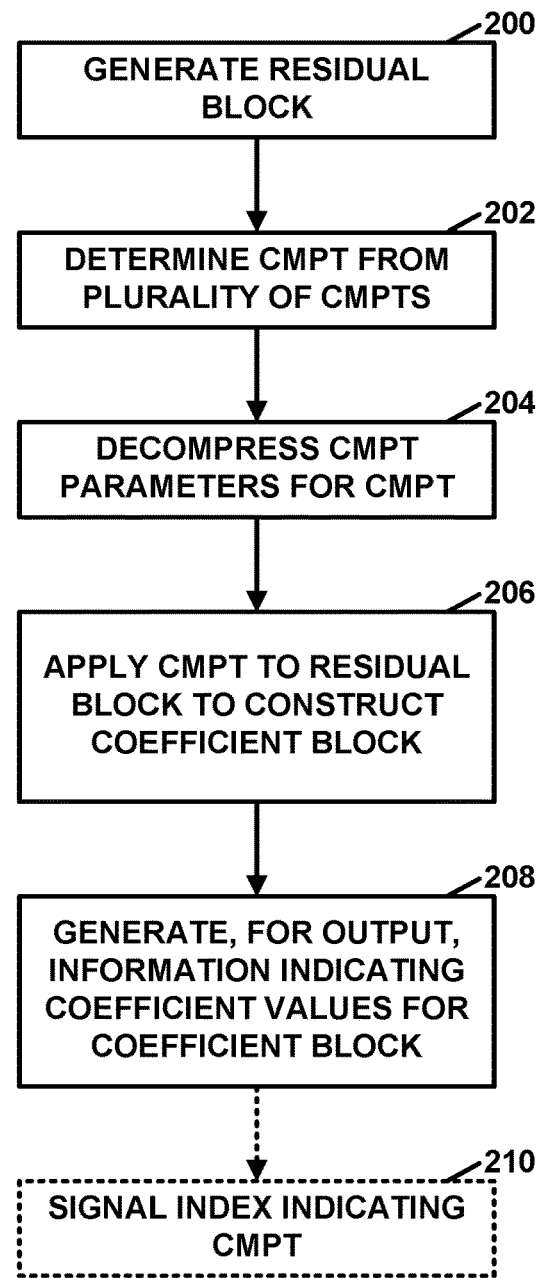
FIG. 10 is a flowchart illustrating an example operation of the video encoder, in accordance with a technique of this disclosure.

FIG. 10 is a flowchart illustrating an example operation of video encoder 20, in accordance with a technique of this disclosure. The flowcharts of this disclosure are provided as examples. In other examples, operations may include more, fewer, or different features. Moreover, in some examples, operations may be performed in different orders or in parallel.

In the example of FIG. 10, video encoder 20 generates a residual block based on differences between samples of a predictive block and samples of an original block of a picture of the video data being encoded (200). For instance, residual generation unit 102 of video encoder 20 (FIG. 8) may generate the residual block such that each respective sample of the residual block is equal to a difference between a sample of the predictive block and a corresponding sample of the original block. The original block may be a coding block of a CU.

Furthermore, in the example of FIG. 10, video encoder 20 determines a CMPT from a plurality of CMPTs (202). In some examples, transform processing unit 104 of video encoder 20 (FIG. 8) determines the CMPT. Video encoder 20 may determine the CMPT in various ways. For example, video encoder 20 may apply multiple CMPTs in the plurality of CMPTs and determine the CMPT that provides the best coding performance. In some examples, video encoder 20 determines the CMPT from the plurality of CMPTs based on the CMPT corresponding to a size, color component type, intra prediction mode of the predictive block, inter/intra prediction mode of the predictive block, or another characteristic.

In the example of FIG. 10, video encoder 20 decompresses CMPT parameters for the CMPT (204). In some examples, transform processing unit 104 of video encoder 20 (FIG. 8) decompresses the CMPT parameters for the CMPT. Video encoder 20 may decompress the CMPT parameters for the CMPT in various ways.

For example, for each respective transform pass of the CMPT, for each respective Givens rotation of the set of Givens rotations included in the respective transform pass, video encoder 20 may use a mapping table (e.g., mapping table 90 of FIG. 7) to determine, based on the respective angle θ (e.g., one of $\theta_0 \ldots \theta_7$ in FIG. 7) for the respective Givens rotation, the sine and cosine of the respective angle θ (e.g., $c_0, s_0, \ldots c_7, s_7$ in FIG. 7) for the respective Givens rotation. In this example, the mapping table being stored in a memory, such as storage media 19 (FIG. 1) or video data memory 101 (FIG. 8).

In another example, the CMPT is a first CMPT of the plurality of CMPTs and the plurality of CMPTs includes a second CMPT. In this example, a memory may store CMPT parameters of the plurality of CMPTs. In this example, the memory may be storage media 19 (FIG. 1), video data memory 101 (FIG. 8), or another memory. Furthermore, in this example, based on the CMPT parameters of the first CMPT including a set of shared CMPT parameters and the CMPT parameters of the second CMPT including the set of shared CMPT parameters, the memory does not store more than one copy of the set of shared CMPT parameters. Thus, in this example, video encoder 20 may decompress the CMPT parameters for the first CMPT in the sense that video encoder 20 determines that the one stored copy of the shared CMPT parameters are part of the full set of CMPT parameters for the first CMPT, thereby expanding the stored set of CMPT parameters for the first CMPT (if any) to include the shared CMPT parameters. In this example, the first CMPT may be associated with a non-principal intra prediction mode and the second CMPT may be associated with a principal intra prediction mode as described elsewhere in this disclosure.

In another example, prior to decompression, the CMPT parameters for the CMPT include codes that replace repeated parameters in the parameter vectors for the CMPT. In other words, special codes can be used to replace parameter values with data indicating which parameters are repeated. In this example, decompressing the CMPT parameters for the CMPT may comprise replacing the codes with the repeated parameters.

In some instances, video encoder 20 may use two or more of the preceding examples related to decompression of the CMPT parameters together.

Furthermore, in the example of FIG. 10, video encoder 20 applies the CMPT to the residual block to construct a coefficient block (206). In some examples, transform processing unit 104 of video encoder 20 (FIG. 8) applies the CMPT to the residual block. In general, to apply a CMPT, video encoder 20 may apply a plurality of transform passes. Input of each transform pass of the plurality of transform passes other than an initial transform pass of the plurality of transform passes comprises output of a previous transform pass of the plurality of transform passes. Furthermore, the CMPT parameters for the CMPT comprise respective parameter vectors for each respective transform pass of the plurality of transform passes. For each respective transform pass of the plurality of transform passes, the respective transform pass may include parallel performance of a respective set of Givens rotations. Each respective Givens rotation of the respective set of Givens rotations takes two input values of the input of the respective pass (e.g., $x_m$ and $x_n$ of FIG. 4) and outputs two output values of output of the respective transform pass (e.g., $t_m$ and $t_n$ of FIG. 4). Factors used for transformation in the respective Givens rotation are defined by a sine and cosine of a respective angle θ for the respective Givens rotation. The sine and cosine of the respective angle θ for the respective Givens rotation correspond to respective CMPT parameters in the parameter vector for the respective transform pass. That is, the parameter vector for the respective transform pass may comprise sine and cosine values for various angle values θ.

Additionally, in the example of FIG. 10, video encoder 20 may generate, for output, information indicating coefficient values for the coefficient block (208). For example, quantization unit 106 of video encoder 20 (FIG. 8) may quantize the coefficient values of the coefficient block, entropy encoding unit 118 of video encoder 20 (FIG. 8) may generate and entropy encode syntax elements corresponding to the quantized transform coefficients. Entropy encoding unit 118 may include the entropy encoded syntax elements in the bitstream.

In some examples, video encoder 20 may signal an index into a list of CMPTs, the index indicating the CMPT (210). For instance, video encoder 20 may include a syntax element in the bitstream indicating the index.

Figure 11:
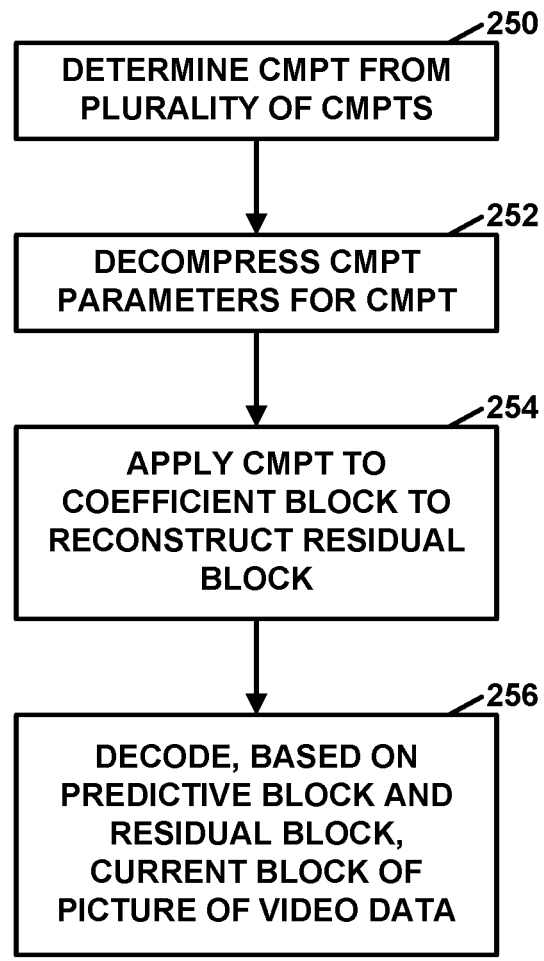
FIG. 11 is a flowchart illustrating an example operation of the video decoder, in accordance with a technique of this disclosure.

FIG. 11 is a flowchart illustrating an example operation of video decoder 30, in accordance with a technique of this disclosure. In the example of FIG. 11, video decoder 30 determines a CMPT from a plurality of CMPTs (250). In some examples, video decoder 30 may receive an index into a list of CMPTs and determine the CMPT based on the received index. For instance, video decoder 30 may determine that the value of the received index specifies a position in the list corresponding to the CMPT.

Furthermore, in the example of FIG. 11, video decoder 30 decompresses CMPT parameters for the CMPT (252). Video decoder 30 may decompress the CMPT parameters for the CMPT in various ways. For instance, video decoder 30 may decompose the CMPT parameters for the CMPT in the manner described above with respective to decompressing the CMPT parameters in FIG. 10.

In the example of FIG. 11, video decoder 30 applies the CMPT to a coefficient block to reconstruct a residual block (254). In some examples, inverse transform processing unit 156 (FIG. 9) applies the CMPT. Video decoder 30 may apply the CMPT to the coefficient block in a manner similar to that described above with video encoder 20 applying the CMPT to the residual block. In essence, the CMPT applied by video encoder 20 may be performed in reverse by video decoder 30.

Additionally, in the example of FIG. 11, video decoder 30 may decode, based on a predictive block and the residual block, a current block of a picture of the video data (256). For example, video decoder 30 may add samples of the predictive block to corresponding samples of the residual block to determine samples of the current block. In other examples, inverse transform processing unit 110 (FIG. 8) of video encoder 20 may perform actions 252, 254, and 256 of FIG. 11.

Certain aspects of this disclosure have been described with respect to extensions of the HEVC standard for purposes of illustration. However, the techniques described in this disclosure may be useful for other video coding processes, including other standard or proprietary video coding processes not yet developed.

A video coder, as described in this disclosure, may refer to a video encoder or a video decoder. Similarly, a video coding unit may refer to a video encoder or a video decoder. Likewise, video coding may refer to video encoding or video decoding, as applicable.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   determining a Compact Multi-Pass Transform (CMPT) from a plurality of CMPTs;
   decompressing CMPT parameters for the CMPT;
   applying the CMPT to a coefficient block to reconstruct a residual block, wherein applying the CMPT comprises applying a plurality of transform passes, wherein:
      input of each transform pass of the plurality of transform passes other than an initial transform pass of the plurality of transform passes comprises output of a previous transform pass of the plurality of transform passes,
      the input of the initial transform pass comprises transform coefficients in the coefficient block,
      output of a last transform pass of the plurality of transform passes comprises values in the residual block,
      the CMPT parameters for the CMPT comprise respective parameter vectors for each respective transform pass of the plurality of transform passes,
      for each respective transform pass of the plurality of transform passes, the respective transform pass includes parallel performance of a respective set of Givens rotations, each respective Givens rotation of the respective set of Givens rotations taking two input values of the input of the respective transform pass and outputting two output values of output of the respective transform pass, wherein factors used for transformation in the respective Givens rotation are defined by a sine and cosine of a respective angle $\theta$ for the respective Givens rotation, the sine and cosine of the respective angle $\theta$ for the respective Givens rotation correspond to respective CMPT parameters in the parameter vector for the respective transform pass; and
   decoding, based on a predictive block and the residual block, a current block of a picture of the video data.

2. The method of claim 1, further comprising receiving an index into a list of the plurality of CMPTs, wherein determining the CMPT comprises determining the CMPT based on the received index.

3. The method of claim 1, wherein decompressing the CMPT parameters for the CMPT comprises:
   for each respective transform pass of the CMPT:
      for each respective Givens rotation of the set of Givens rotations included in the respective transform pass, using a mapping table to determine, based on the respective angle $\theta$ for the respective Givens rotation, the sine and cosine of the respective angle $\theta$ for the respective Givens rotation, the mapping table being stored in a memory.

4. The method of claim 1, wherein the CMPT is a first CMPT of the plurality of CMPTs and the plurality of CMPTs includes a second CMPT, the method further comprising:
   storing CMPT parameters of the plurality of CMPTs in a memory, wherein based on the CMPT parameters of the first CMPT including a set of shared CMPT parameters and CMPT parameters of the second CMPT including the set of shared CMPT parameters, the memory does not store more than one copy of the set of shared CMPT parameters.

5. The method of claim 4, wherein:
   the plurality of CMPTs includes CMPTs associated with respective principal intra prediction directions in a plurality of principal intra prediction directions and the plurality of CMPTs includes CMPTs associated with respective non-principal intra prediction directions in a plurality of non-principal intra prediction directions,
   the first CMPT is associated with a particular non-principal intra prediction direction of the plurality of non-principal intra prediction directions,
   the particular non-principal intra prediction direction is closest to a particular principal intra prediction direction in the plurality of principal intra prediction directions,
   the second CMPT is associated with the particular principal intra prediction direction, and
   applying the first CMPT comprises:
      using the CMPT parameters of the second CMPT to perform a transform process to derive a first group of residual samples; and
      using supplemental CMPT parameters to perform a transform on the first group of residual samples, thereby deriving final residual samples of the residual block, the supplemental CMPT parameters being those parameters of the first CMPT not in the set of shared parameters.

6. The method of claim 1, wherein prior to decompression, the CMPT parameters for the CMPT include codes that replace repeated parameters in the parameter vectors for the CMPT.

7. A method of encoding video data, the method comprising:
   generating a residual block based on differences between samples of a predictive block and samples of an original block of a picture of the video data being encoded;
   determining a Compact Multi-Pass Transform (CMPT) from a plurality of CMPTs;
   decompressing CMPT parameters for the CMPT;
   applying the CMPT to the residual block to construct a coefficient block, wherein applying the CMPT comprises applying a plurality of transform passes;
      input of each transform pass of the plurality of transform passes other than an initial transform pass of the plurality of transform passes comprises output of a previous transform pass of the plurality of transform passes, the input of the initial transform pass comprises values in the residual block, output of a last transform pass of the plurality of transform passes comprises transform coefficients in the coefficient block, the CMPT parameters for the CMPT comprise respective parameter vectors for each respective transform pass of the plurality of transform passes, for each respective transform pass of the plurality of transform passes, the respective transform pass includes parallel performance of a respective set of Givens rotations, each respective Givens rotation of the respective set of Givens rotations taking two input values of the input of the respective transform pass and outputting two output values of output of the respective transform pass, wherein factors used for transformation in the respective Givens rotation are defined by a sine and cosine of a respective angle $\theta$ for the respective Givens rotation, the sine and cosine of the respective angle $\theta$ for the respective Givens rotation correspond to respective CMPT parameters in the parameter vector for the respective transform pass; and generating, for output, information indicating the transform coefficients in the coefficient block.

8. The method of claim 7, further comprising signaling an index into a list of the plurality of CMPTs, the index indicating the CMPT.

9. The method of claim 7, wherein decompressing the CMPT parameters for the CMPT comprises:

for each respective transform pass of the CMPT:
for each respective Givens rotation of the set of Givens rotations included in the respective transform pass, using a mapping table to determine, based on the respective angle $\theta$ for the respective Givens rotation, the sine and cosine of the respective angle $\theta$ for the respective Givens rotation, the mapping table being stored in a memory.

10. The method of claim 7, wherein the CMPT is a first CMPT of the plurality of CMPTs and the plurality of CMPTs includes a second CMPT, the method further comprising:

storing CMPT parameters of the plurality of CMPTs in a memory, wherein based on the CMPT parameters of the first CMPT including a set of shared CMPT parameters and the CMPT parameters of the second CMPT including the set of shared CMPT parameters, the memory does not store more than one copy of the set of shared CMPT parameters.

11. The method of claim 10, wherein:

the plurality of CMPTs includes CMPTs associated with respective principal intra prediction directions in a plurality of principal intra prediction directions and the plurality of CMPTs includes CMPTs associated with respective non-principal intra prediction directions in a plurality of non-principal intra prediction directions, the first CMPT is associated with a particular non-principal intra prediction direction of the plurality of non-principal intra prediction directions, the particular non-principal intra prediction direction is closest to a particular principal intra prediction direction in the plurality of principal intra prediction directions, the second CMPT is associated with the particular principal intra prediction direction, and applying the first CMPT comprises:
using the CMPT parameters of the second CMPT to perform a transform process to derive a first group of transform coefficients; and
using supplemental CMPT parameters to perform a transform on the first group of transform coefficients, thereby deriving final transform coefficients of the coefficient block, the supplemental CMPT parameters being those parameters of the first CMPT not in the set of shared parameters.

12. The method of claim 7, wherein prior to decompression, the CMPT parameters for the CMPT include codes that replace repeated parameters in the parameter vectors for the CMPT.

13. A device for decoding video data, the device comprising:

a data storage medium configured to store the video data; and a video decoder configured to:
determine a Compact Multi-Pass Transform (CMPT) from a plurality of CMPTs;
decompress CMPT parameters for the CMPT;
apply the CMPT to a coefficient block to reconstruct a residual block, wherein the video decoder is configured such that, as part of applying the CMPT, the video decoder applies a plurality of transform passes, wherein:
input of each transform pass of the plurality of transform passes other than an initial transform pass of the plurality of transform passes comprises output of a previous transform pass of the plurality of transform passes,
the input of the initial transform pass comprises transform coefficients in the coefficient block,
output of a last transform pass of the plurality of transform passes comprises values in the residual block,
the CMPT parameters for the CMPT comprise respective parameter vectors for each respective transform pass of the plurality of transform passes,
for each respective transform pass of the plurality of transform passes, the respective transform pass includes parallel performance of a respective set of Givens rotations, each respective Givens rotation of the respective set of Givens rotations taking two input values of the input of the respective transform pass and outputting two output values of output of the respective transform pass, wherein factors used for transformation in the respective Givens rotation are defined by a sine and cosine of a respective angle $\theta$ for the respective Givens rotation, the sine and cosine of the respective angle $\theta$ for the respective Givens rotation correspond to respective CMPT parameters in the parameter vector for the respective transform pass; and
decode, based on a predictive block and the residual block, a current block of a picture of the video data.

14. The device of claim 13, wherein the video decoder is configured such that, as part of determining the CMPT, the video decoder receives an index into a list of the plurality of CMPTs and determines the CMPT based on the received index.

15. The device of claim 13, wherein:
the device comprises a memory that stores a mapping table; and the video decoder is configured such that, as part of decompressing the CMPT parameters for the CMPT, the video decoder:
for each respective transform pass of the CMPT:
for each respective Givens rotation of the set of Givens rotations included in the respective transform pass, uses the mapping table to determine, based on the respective angle θ for the respective Givens rotation, the sine and cosine of the respective angle θ for the respective Givens rotation.

16. The device of claim 13, wherein:
the CMPT is a first CMPT of the plurality of CMPTs and the plurality of CMPTs includes a second CMPT,
the device comprises a memory that stores CMPT parameters of the plurality of CMPTs, and
based on the CMPT parameters of the first CMPT including a set of shared CMPT parameters and the CMPT parameters of the second CMPT including the set of shared CMPT parameters, the memory does not store more than one copy of the set of shared CMPT parameters.

17. The device of claim 16, wherein:
the plurality of CMPTs includes CMPTs associated with respective principal intra prediction directions in a plurality of principal intra prediction directions and the plurality of CMPTs includes CMPTs associated with respective non-principal intra prediction directions in a plurality of non-principal intra prediction directions,
the first CMPT is associated with a particular non-principal intra prediction direction of the plurality of non-principal intra prediction directions,
the particular non-principal intra prediction direction is closest to a particular principal intra prediction direction in the plurality of principal intra prediction directions,
the second CMPT is associated with the particular principal intra prediction direction, and
the video decoder is configured such that, as part of applying the first CMPT, the video decoder:
uses the CMPT parameters of the second CMPT to perform a transform process to derive a first group of residual samples; and
uses supplemental CMPT parameters to perform a transform on the first group of residual samples, thereby deriving final residual samples of the residual block, the supplemental CMPT parameters being those parameters of the first CMPT not in the set of shared parameters.

18. The device of claim 13, wherein prior to decompression, the CMPT parameters for the CMPT include codes that replace repeated parameters in the parameter vectors for the CMPT.

19. The device of claim 13, wherein the device comprises:
an integrated circuit,
a microprocessor, or
a wireless communication device.

20. A device for encoding video data, the device comprising:
a memory configured to store the video data; and
a video encoder configured to:
generate a residual block based on differences between samples of a predictive block and samples of an original block of a picture of the video data being encoded;
determine a Compact Multi-Pass Transform (CMPT) from a plurality of CMPTs;
decompress CMPT parameters for the CMPT;
apply the CMPT to the residual block to construct a coefficient block, wherein the video encoder is configured such that, as part of applying the CMPT, the video encoder applies a plurality of transform passes, wherein:
input of each transform pass of the plurality of transform passes other than an initial transform pass of the plurality of transform passes comprises output of a previous transform pass of the plurality of transform passes,
the input of the initial transform pass comprises values in the residual block;
output of a last transform pass of the plurality of transform passes comprises transform coefficients in the coefficient block,
the CMPT parameters for the CMPT comprise respective parameter vectors for each respective transform pass of the plurality of transform passes,
for each respective transform pass of the plurality of transform passes, the respective transform pass includes parallel performance of a respective set of Givens rotations, each respective Givens rotation of the respective set of Givens rotations taking two input values of the input of the respective transform pass and outputting two output values of output of the respective transform pass, wherein factors used for transformation in the respective Givens rotation are defined by a sine and cosine of a respective angle θ for the respective Givens rotation, the sine and cosine of the respective angle θ for the respective Givens rotation correspond to respective CMPT parameters in the parameter vector for the respective transform pass; and
generate, for output, information indicating the transform coefficients in the coefficient block.

21. The device of claim 20, wherein the video encoder is configured to signal an index into a list of the plurality of CMPTs, the index indicating the CMPT.

22. The device of claim 20, wherein:
the device comprises a memory that stores a mapping table, and
the video encoder is configured such that, as part of decompressing the CMPT parameters for the CMPT, the video encoder:
for each respective transform pass of the CMPT:
for each respective Givens rotation of the set of Givens rotations included in the respective transform pass, uses the mapping table to determine, based on the respective angle θ for the respective Givens rotation, the sine and cosine of the respective angle θ for the respective Givens rotation.

23. The device of claim 20, wherein:
the CMPT is a first CMPT of the plurality of CMPTs and the plurality of CMPTs includes a second CMPT,
the device further comprises a memory that stores CMPT parameters of the plurality of CMPTs, and
based on the CMPT parameters of the first CMPT including a set of shared CMPT parameters and the CMPT parameters of the second CMPT including the set of shared CMPT parameters, the memory does not store more than one copy of the set of shared CMPT parameters.

24. The device of claim 23, wherein:
the plurality of CMPTs includes CMPTs associated with respective principal intra prediction directions in a plurality of principal intra prediction directions and the plurality of CMPTs includes CMPTs associated with respective non-principal intra prediction directions in a plurality of non-principal intra prediction directions, the first CMPT is associated with a particular non-principal intra prediction direction of the plurality of non-principal intra prediction directions, the particular non-principal intra prediction direction is closest to a particular principal intra prediction direction in the plurality of principal intra prediction directions, the second CMPT is associated with the particular principal intra prediction direction, and the video encoder is configured such that, as part of applying the first CMPT, the video encoder:

uses the CMPT parameters of the second CMPT to perform a transform process to derive a first group of transform coefficients; and uses supplemental CMPT parameters to perform a transform on the first group of transform coefficients, thereby deriving final transform coefficients of the coefficient block, the supplemental CMPT parameters being those parameters of the first CMPT not in the set of shared parameters.

25. The device of claim 20, wherein prior to decompression, the CMPT parameters for the CMPT include codes that replace repeated parameters in the parameter vectors for the CMPT.

26. The device of claim 20, wherein the device comprises:
an integrated circuit,
a microprocessor, or
a wireless communication device.

* * * * *